United States Patent
Shao et al.

(10) Patent No.: US 12,225,271 B2
(45) Date of Patent: Feb. 11, 2025

(54) VIDEO GENERATION METHOD AND RELATED APPARATUS

(71) Applicant: HUAWEI TECHNOLOGIES CO., LTD., Guangdong (CN)

(72) Inventors: Bin Shao, Shenzhen (CN); Jun Yue, Shenzhen (CN); Li Qian, Shenzhen (CN); Songcen Xu, Shenzhen (CN); Xueyan Huang, Shenzhen (CN); Yajiao Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 115 days.

(21) Appl. No.: 18/070,689

(22) Filed: Nov. 29, 2022

(65) Prior Publication Data
US 2023/0089566 A1 Mar. 23, 2023

Related U.S. Application Data

(63) Continuation of application No. PCT/CN2021/097047, filed on May 29, 2021.

(30) Foreign Application Priority Data

May 30, 2020 (CN) .......................... 202010480675

(51) Int. Cl.
*H04N 21/80* (2011.01)
*G06T 7/00* (2017.01)
(Continued)

(52) U.S. Cl.
CPC .......... *H04N 21/80* (2013.01); *G06T 7/0002* (2013.01); *G06V 10/44* (2022.01); *G06V 20/70* (2022.01);
(Continued)

(58) Field of Classification Search
CPC ...... H04N 21/80; G06V 20/70; G06V 40/172; G06V 10/44; G06T 7/0002; G06T 2207/30168; G06T 2207/30201
See application file for complete search history.

(56) References Cited

U.S. PATENT DOCUMENTS

2016/0014482 A1* 1/2016 Chen .................. H04N 21/8456
386/241
2021/0256059 A1* 8/2021 Gan ...................... G06N 3/049

FOREIGN PATENT DOCUMENTS

CN 105893412 A 8/2016
CN 108596265 A 9/2018
(Continued)

OTHER PUBLICATIONS

International Search Report and Written Opinion issued in PCT/CN2021/097047, dated Jul. 28, 2021, 11 pages.
(Continued)

*Primary Examiner* — Thai Q Tran
*Assistant Examiner* — Jose M Mesa

(57) ABSTRACT

A video generation method may be applied to the field of image processing and video generation in the field of artificial intelligence. The method includes: receiving a video generation instruction, and obtaining text information and image information in response to the video generation instruction, where the text information includes one or more keywords, and the image information includes N images; obtaining, based on the one or more keywords, one or more image features that is in each of the N images and corresponds to the one or more keywords; and inputting the one or more keywords and the one or more image features of the N images into a target generator network to generate a target video, where the target video includes M images, and the M images are generated based on the one or more image
(Continued)

features of the N images and correspond to the one or more keywords.

18 Claims, 19 Drawing Sheets

(51) Int. Cl.
    *G06V 10/44*     (2022.01)
    *G06V 20/70*     (2022.01)
    *G06V 40/16*     (2022.01)

(52) U.S. Cl.
    CPC .. G06V 40/172 (2022.01); *G06T 2207/30168* (2013.01); *G06T 2207/30201* (2013.01)

(56) References Cited

FOREIGN PATENT DOCUMENTS

| CN | 109658369 A | 4/2019 |
|---|---|---|
| CN | 111669515 A | 9/2020 |

OTHER PUBLICATIONS

Office Action issued in CN202010480675.6, dated Dec. 31, 2020, 8 pages.

\* cited by examiner

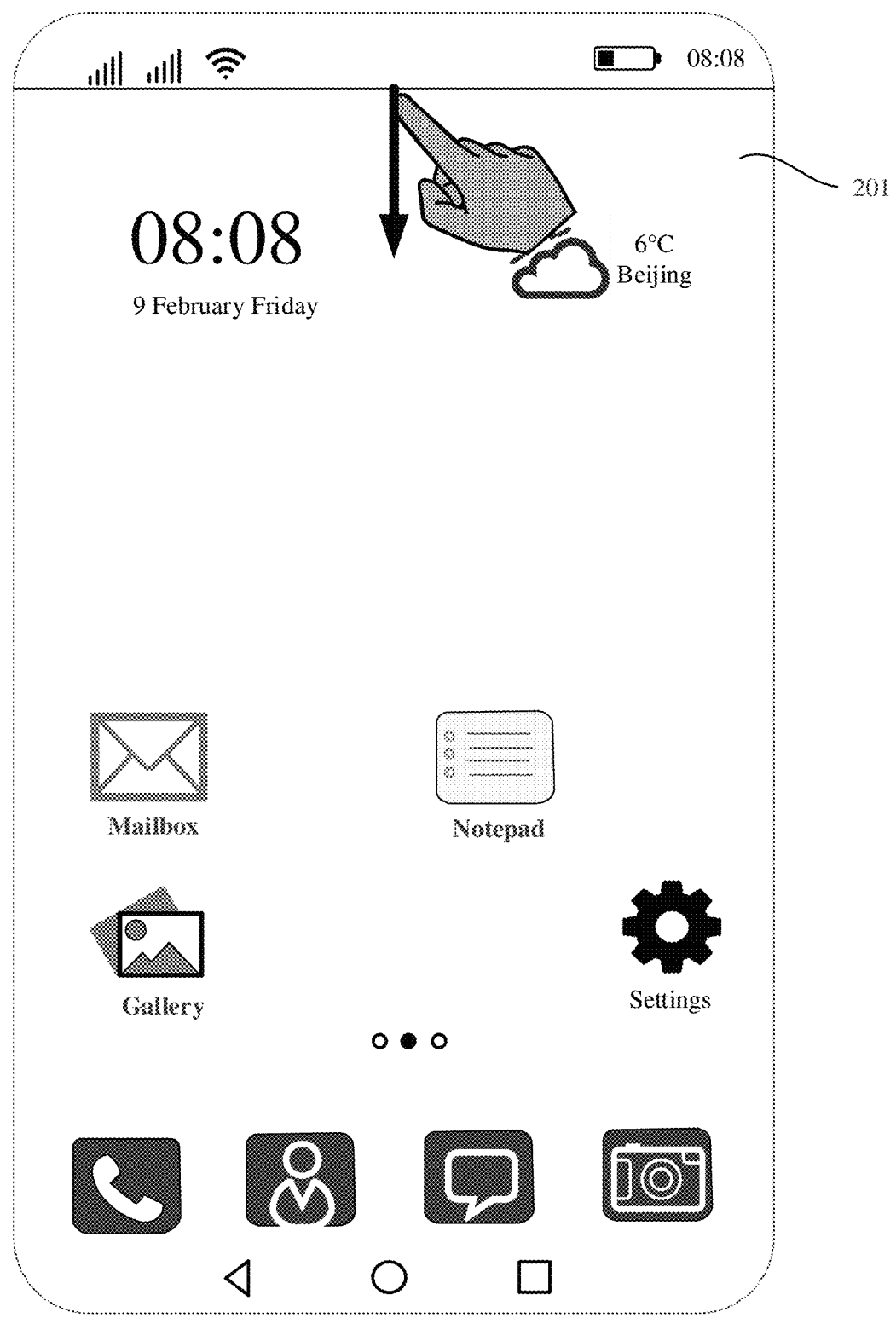
FIG. 2A(1)

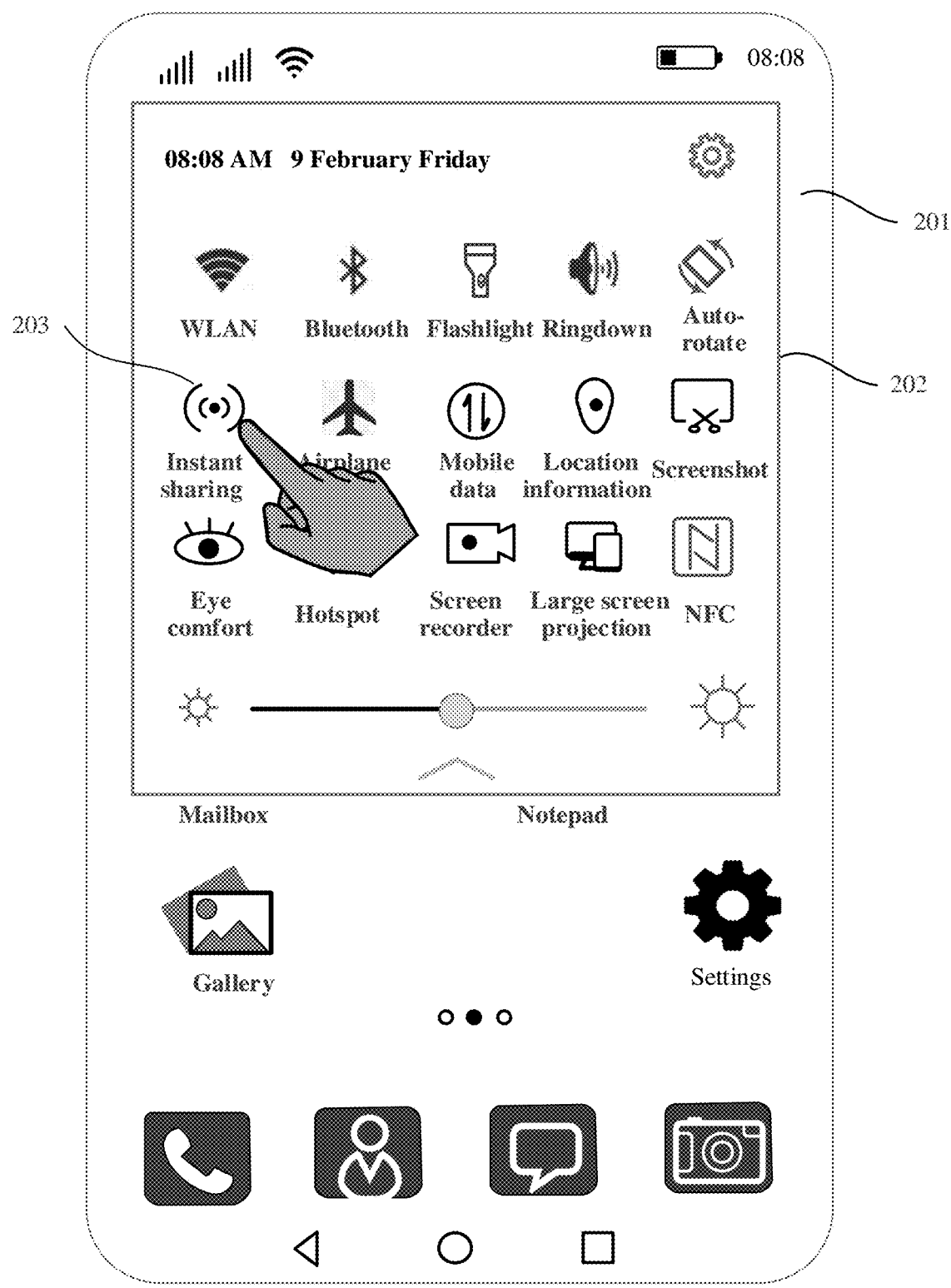
FIG. 2A(2)

VIDEO GENERATION METHOD AND RELATED APPARATUS

CROSS-REFERENCE TO RELATED APPLICATIONS

This application is a continuation of International Application No. PCT/CN2021/097047, filed on May 29, 2021, which claims priority to Chinese Patent Application No. 202010480675.6, filed on May 30, 2020. The disclosures of the aforementioned applications are hereby incorporated by reference in their entireties.

TECHNICAL FIELD

This disclosure relates to the field of artificial intelligence, and in particular, to a video generation method and a related apparatus.

BACKGROUND

Status sharing is a method used by many users in the new media society today. Status sharing enables the users to be understood by other people, thereby promoting communication between people. Rich status sharing, such as geographical location status sharing in WeChat, status sharing in QQ talk about, and video sharing in Douyin, can promote friendly development of a social platform, and improve life and friend-making experience of the users.

However, on a social platform, sharing of a single piece of geographical location information, a single text, or a single image enables the users to obtain less information, and requirements in vision and hearing cannot be simultaneously met. Therefore, to meet requirements of the users in vision and hearing, a video may be shot and then shared. However, video sharing after a video is shot brings some inconvenience to a user, and requires the user to spend some time to perform manual shooting, and quality and content of the shot video are easily limited by a shooting technology of the user and a shooting condition. If an image is directly used to synthesize a video, the video is limited to switching-type showing in a form of slides and lacks richness of content.

Therefore, how to automatically generate a video on the premise of ensuring richness of video content is an urgent problem to be resolved.

SUMMARY

Embodiments of this disclosure provide a video generation method and a related apparatus, so that a video can be generated based on a text and an image, and a user may share a life status of the user in real time.

According to a first aspect, an embodiment of this disclosure provides a video generation method, which may include: receiving a video generation instruction, and obtaining text information and image information in response to the video generation instruction, where the text information includes one or more keywords, the image information includes N images, and N is a positive integer greater than or equal to 1; obtaining, based on the one or more keywords, an image feature that is in each of the N images and that corresponds to the one or more keywords; and inputting the one or more keywords and image features of the N images into a target generator network to generate a target video, where the target video includes M images, the M images are images that are generated based on the image features of the N images and that correspond to the one or more keywords, and M is a positive integer greater than 1.

During implementation of this embodiment, an electronic device may automatically generate a video based on text information and image information, so that a user may share a life status of the user in real time. After receiving a video generation instruction, the electronic device may obtain text information and image information in response to the video generation instruction, where the text information includes one or more keywords, and the image information includes N images. The text information may be used to describe video content (for example, the one or more keywords may include a person, a time, a place, an event, or an action) of a to-be-generated video, and the image information may be used to extract or generate a video image of each frame. Therefore, an image feature that is in each of the N images and that corresponds to the one or more keywords may be extracted based on the one or more keywords, and then the one or more keywords and image features of the N images may be input into the target generator network to generate a target video. The video is generated by jointly using a text and the images, so that for the generated video, the input image information may be adjusted based on the input text information, thereby greatly enriching the video content, and avoiding a video generated by directly stacking a plurality of images on an existing terminal device, where the video is limited to switching-type showing in a form of slides and lacks richness of content. In addition, a user requirement is met.

In a possible implementation, the obtaining text information in response to the video generation instruction includes: obtaining the text information from one or more of text input information, voice input information, user preference information, user physiological data information, or current environment information in response to the video generation instruction, where the current environment information includes one or more of current weather information, current time information, or current geographical location information. During implementation of this embodiment, in response to the video generation instruction, the electronic device may obtain information (text input information or voice input information) specifically input by the user, or obtain current environment information by using a sensor on the electronic device, or extract text information from user preference information extracted from historical interaction information, and use the obtained information together with the obtained image information to generate the target video. Multi-modal information is used to extract the text information to assist in video generation, so that the generated video may reflect a current user status (for example, a weather environment in the generated video is the same as a weather environment in which the user is currently located). The multi-modal information may include a text, preference information, environment information, and the like. For example, when the user does not or cannot perform manual or voice input, only current environment information obtained by the sensor or a preference extracted from historical interaction information may also be relied on and used as the input text information, which is used together with the input image information to generate the target video.

In a possible implementation, the obtaining image information in response to the video generation instruction includes: obtaining, in response to the video generation instruction, an image corresponding to at least one of the one or more keywords from a plurality of pre-stored images. During implementation of this embodiment, the electronic device may obtain, based on text information, image information related to the text information. For example, when the image information is obtained, an image of a corresponding place may be obtained based on current geographical location information or place information entered by the user, to generate a target video. For example, when the user visits the Palace Museum, an image related to the Palace Museum may be obtained and used to synthesize a target video, to facilitate real-time sharing of a life status by the user. When the image information is obtained, an image of a corresponding place may alternatively be obtained based on person information entered by the user, to generate a target video, so that a user requirement is met. For example, the user enters "Xiaoming is playing football on a playground", and at least one related image of keywords "Xiaoming", "playground", and "football" may be obtained and used to synthesize a target video.

In a possible implementation, the video generation instruction includes a facial recognition request; and the obtaining image information in response to the video generation instruction includes: performing facial recognition in response to the video generation instruction and obtaining a facial recognition result; and obtaining, based on the facial recognition result, at least one image that matches the facial recognition result from a plurality of pre-stored images. During implementation of this embodiment, when obtaining the image information, the electronic device may first obtain a facial recognition result by performing facial recognition, and further directly obtain, from the pre-stored images based on the facial recognition result, an image that includes the user. This facilitates direct generation of a status video related to the user, and timely sharing of a current status of the user. For example, after a user A is recognized through facial recognition, an image of the user A may be obtained from a plurality of pre-stored images. In this way, a video including the user A may be generated without requiring the user to screen images, thereby facilitating a user operation, and improving user experience.

In a possible implementation, the video generation instruction includes at least one image label, and each image label in the at least one image label corresponds to at least one of a plurality of pre-stored images; and the obtaining image information in response to the video generation instruction includes: obtaining, in response to the video generation instruction and based on the at least one image label, at least one image corresponding to each image label in the at least one image label from the plurality of pre-stored images. During implementation of this embodiment, when obtaining the image information, the electronic device may obtain at least one corresponding image by using the at least one image label carried in the video generation instruction, to generate a target video. When the user wants to generate an interesting video by using some images, images that the user is interested in or requires may be directly obtained through screening, to generate a video, so that a viewing requirement of the user is met. For example, the user may select an image label "cat", and after a plurality of images of the cat are obtained, a dynamic video with the cat as a leading role is generated by using the plurality of images of the cat together with text information. For another example, the user may further select an image label "Xiaoming in childhood", and after a plurality of images of Xiaoming in childhood are obtained, a dynamic video about childhood of Xiaoming is generated by using the plurality of images of Xiaoming in childhood together with text information.

In a possible implementation, image quality of each of the obtained N images is greater than a preset threshold. During implementation of this embodiment, before the image information is obtained, image quality scoring needs to be performed on a to-be-selected image, and when an image quality score is less than the preset threshold, the image is not used to generate the video. The video is generated by using an image whose image quality is greater than the preset threshold, thereby ensuring that image quality of the target video finally generated by using the image is relatively high, so that viewing experience of the user is met.

In a possible implementation, the method further includes: performing image quality scoring on the obtained N images, to obtain an image quality scoring result corresponding to each of the N images; and performing image quality enhancement processing on an image whose image quality scoring result is less than a preset threshold, and updating the image with enhanced image quality to the N images. During implementation of this embodiment, after the image information is obtained, image quality scoring needs to be performed on all obtained images. When quality of an image is relatively poor, image quality enhancement may be performed on the image, to improve video quality when a video is generated by using the image, thereby meeting viewing experience of the user.

In a possible implementation, the inputting the one or more keywords and image features of the N images into a target generator network to generate a target video includes: extracting a first spatial variable that is in vector space and that corresponds to each of the one or more keywords; extracting second spatial variables that are in vector space and that respectively correspond to the image features of the N images; and inputting the first spatial variable and the second spatial variables into the target generator network to generate the target video. During implementation of this embodiment, first, the first spatial variable corresponding to the text information and a second spatial variable of the image feature of each image in the image information may be separately extracted. The first spatial variable may be a word vector that is in latent space and that identifies the text information. The second spatial variable of each image may be a vector that is in latent space and that identifies the image feature of the image. Spatial vector extraction helps the generator network better generate the target video. For example, the first spatial variable that is in vector space and that corresponds to each of the one or more keywords is extracted by using a Word2Vec model, and the second spatial variables that are in vector space and that respectively correspond to the image features of the N images are extracted by using a downsampling convolutional network.

In a possible implementation, the method further includes: obtaining sample text information, sample image information, and a real video data set, and building a discriminator network and a video generation-based generator network; inputting the sample text information and the sample image information into the generator network to generate a sample video; using the sample video and the real video data set as input to the discriminator network to obtain a discrimination loss result, where the discrimination loss result is 1 when the sample video belongs to the real video data set; and training the generator network based on the discrimination loss result to obtain the target generator network. During implementation of this embodiment, the generator network and the discriminator network need to be trained by using sample data. The electronic device first generates a video based on the sample data by using the generator network, and then inputs <generated video, and real video> into a discriminator. The discriminator determines a source of the input, and if the source of the input is the generated video, the discriminator determines the input as false 0; or otherwise, the discriminator determines the input as true 1. In such a repeated adversarial training manner, content of the generated video can be further standardized, and authenticity of the generated video and quality of the generated video can be gradually improved, thereby facilitating video sharing.

According to a second aspect, an embodiment of this disclosure provides a video generation apparatus, including:

- a receiving and responding unit, configured to receive a video generation instruction, and obtain text information and image information in response to the video generation instruction, where the text information includes one or more keywords, the image information includes N images, and N is a positive integer greater than or equal to 1;
- an extraction unit, configured to obtain, based on the one or more keywords, an image feature that is in each of the N images and that corresponds to the one or more keywords; and
- a generation unit, configured to input the one or more keywords and image features of the N images into a target generator network to generate a target video, where the target video includes M images, the M images are images that are generated based on the image features of the N images and that correspond to the one or more keywords, and M is a positive integer greater than 1.

In a possible implementation, the receiving and responding unit is specifically configured to obtain the text information from one or more of text input information, voice input information, user preference information, user physiological data information, or current environment information in response to the video generation instruction, where the current environment information includes one or more of current weather information, current time information, or current geographical location information.

In a possible implementation, the receiving and responding unit is specifically configured to obtain, in response to the video generation instruction, an image corresponding to at least one of the one or more keywords from a plurality of pre-stored images.

In a possible implementation, the video generation instruction includes a facial recognition request; and the receiving and responding unit is specifically configured to: perform facial recognition in response to the video generation instruction and obtain a facial recognition result; and obtain, based on the facial recognition result, at least one image that matches the facial recognition result from a plurality of pre-stored images.

In a possible implementation, the video generation instruction includes at least one image label, and each image label in the at least one image label corresponds to at least one of a plurality of pre-stored images; and the receiving and responding unit is specifically configured to: obtain, in response to the video generation instruction and based on the at least one image label, at least one image corresponding to each image label in the at least one image label from the plurality of pre-stored images.

In a possible implementation, image quality of each of the obtained N images is greater than a preset threshold.

In a possible implementation, the apparatus further includes: a scoring unit, configured to perform image quality scoring on the obtained N images, to obtain an image quality scoring result corresponding to each of the N images; and an enhancing unit, configured to perform image quality enhancement processing on an image whose image quality scoring result is less than a preset threshold, and update the image with enhanced image quality to the N images.

In a possible implementation, the generation unit is specifically configured to: extract a first spatial variable that is in vector space and that corresponds to each of the one or more keywords; extract second spatial variables that are in vector space and that respectively correspond to the image features of the N images; and input the first spatial variable and the second spatial variables into the target generator network to generate the target video.

In a possible implementation, the apparatus further includes a training unit. The training unit is configured to: obtain sample text information, sample image information, and a real video data set, and build a discriminator network and a video generation-based generator network; input the sample text information and the sample image information into the generator network to generate a sample video; use the sample video and the real video data set as input to the discriminator network to obtain a discrimination loss result, where the discrimination loss result is 1 when the sample video belongs to the real video data set; and train the generator network based on the discrimination loss result to obtain the target generator network.

According to a third aspect, an embodiment of this disclosure provides an electronic device. The electronic device includes a processor, and the processor is configured to support the electronic device in implementing a corresponding function in the video generation method provided in the first aspect. The electronic device may further include a memory. The memory is configured to be coupled to the processor, and stores program instructions and data that are necessary for the electronic device. The electronic device may further include a communication interface, configured to be used by the electronic device to communicate with another device or a communication network.

According to a fourth aspect, an embodiment of this disclosure provides a computer storage medium, configured to store computer software instructions used by the video generation apparatus provided in the second aspect, and the computer software instructions include a program designed for executing the foregoing aspect.

According to a fifth aspect, an embodiment of this disclosure provides a computer program. The computer program includes instructions, and when the computer program is executed by a computer, the computer is enabled to perform the procedure performed by the video generation apparatus in the second aspect.

According to a sixth aspect, this disclosure provides a chip system. The chip system includes a processor, configured to support an electronic device in implementing a function in the first aspect, for example, generating or processing information in the video generation method. In a possible design, the chip system further includes a memory. The memory is configured to store program instructions and data that are necessary for an electronic device. The chip system may include a chip, or may include a chip and another discrete component.

BRIEF DESCRIPTION OF DRAWINGS

To describe technical solutions in embodiments of this disclosure or in the background more clearly, the following describes accompanying drawings used in embodiments of this disclosure or in the background.

FIG. 2A(1) and FIG. 2A(2) are a schematic diagram of a group of user interfaces for receiving a video generation instruction according to an embodiment of this disclosure;

DESCRIPTION OF EMBODIMENTS

Figure 1A:
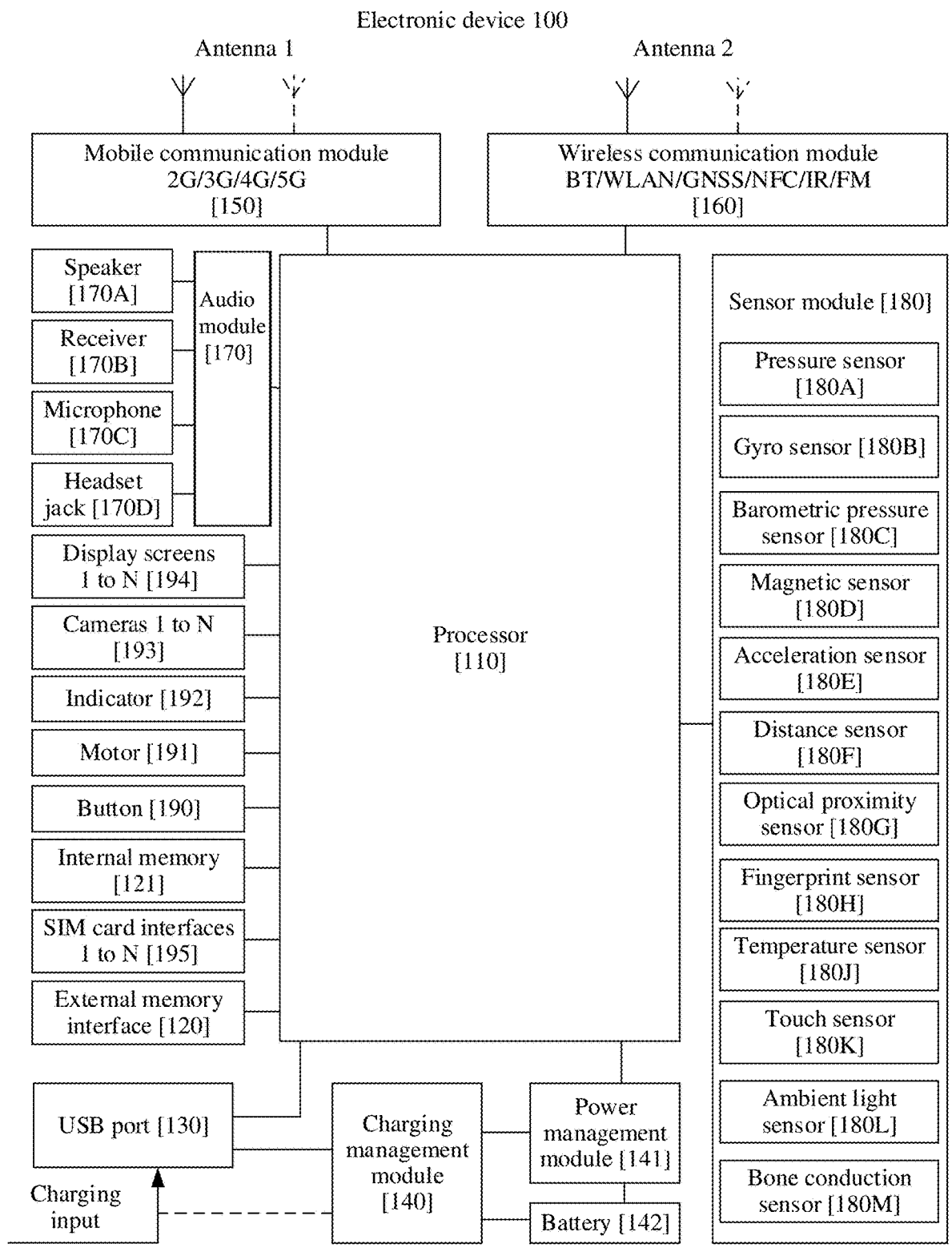
FIG. 1A is a schematic diagram of a structure of an electronic device 100 according to an embodiment of this disclosure.

The following describes embodiments of this disclosure with reference to accompanying drawings in embodiments of this disclosure.

In the specification, claims, and accompanying drawings of this disclosure, the terms "first", "second", and so on are intended to distinguish between different objects but do not indicate a particular order. In addition, terms "include", "have", and any other variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of this disclosure. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

Terms such as "component", "module", and "system" used in this specification are used to indicate a computer-related entity, hardware, firmware, a combination of hardware and software, software, or software being executed. For example, a component may be, but is not limited to, a process that is run on a processor, a processor, an object, an executable file, an execution thread, a program, and/or a computer. As illustrated by using figures, both a computing device and an application that is run on the computing device may be components. One or more components may reside within a process and/or an execution thread, and a component may be located on one computer and/or distributed between two or more computers. In addition, these components may be executed by various computer-readable media that store various data structures. The components may communicate by using a local and/or remote process and based on, for example, a signal having one or more data packets (for example, data from two components interacting with another component in a local system, in a distributed system, and/or across a network such as the internet interacting with other systems by using the signal).

Some terms in this disclosure are first described, to help a person skilled in the art have a better understanding.

(1) Recurrent neural network (RNN): is a type of recursive neural network in which sequence data is used as input, recursion is performed in a sequence evolution direction, and all nodes (recurrent units) are connected in a chain form. The recurrent neural network has memory, parameter sharing, and Turing completeness, and therefore has some advantages in learning a nonlinear characteristic of a sequence. The recurrent neural network is used in natural language processing (NLP), such as speech recognition, language modeling, and machine translation, and is also used in various types of time series forecasting. The recurrent neural network built by using a convolutional neural network (CNN) may process a computer vision problem including sequence input.

(3) Gesture recognition: is intended to recognize a physical motion or a "gesture" of a human, and may be based on a form in which a human motion is recognized as input. Gesture recognition is also classified as a non-contact user interface. Unlike a touchscreen device, a device with a non-contact user interface may be controlled without touching. The device may have one or more sensors or cameras that may monitor a movement of a user. When the device detects a movement corresponding to a command, the device responds with appropriate output. For example, waving a hand in a specific pattern in front of the device may instruct the device to start a specific application.

(4) Word2Vec model: is a group of correlation models used to generate word vectors. These models are shallow double-layer neural networks that are trained to rebuild linguistic word texts. The networks are represented by words, and input words of adjacent positions need to be guessed. Under an assumption of a bag-of-words model in Word2Vec, an order of words is not important. After training is complete, the Word2Vec model may be used to map each word to a vector, which may be used to represent a relationship between words.

The following describes an example electronic device provided in the following embodiment of this disclosure.

FIG. 1A is a schematic diagram of a structure of an electronic device 100 according to an embodiment of this disclosure. The electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device 100. In some other embodiments of this disclosure, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency. For example, in this disclosure, the processor may receive a video generation instruction, and obtain text information and image information in response to the video generation instruction, where the text information includes one or more keywords, and the image information includes N images; obtain, based on the one or more keywords, an image feature that is in each of the N images and that corresponds to the one or more keywords; and input the one or more keywords and image features of the N images into a target generator network to generate a target video, where the target video includes M images, and the M images are images that are generated based on the image features of the N images and that correspond to the one or more keywords.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) port, and/or the like.

It may be understood that an interface connection relationship between the modules that is shown in this embodiment is merely an example for description, and does not constitute a limitation on the structure of the electronic device 100. In some other embodiments of this disclosure, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect the battery 142, the charging management module 140, and the processor 110. The power management module 141 receives an input of the battery 142 and/or the charging management module 140, and supplies power to the processor 110, the internal memory 121, an external memory, the display screen 194, the camera 193, the wireless communication module 160, and the like. The power management module 141 may be configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit/receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a wireless communication solution that is applied to the electronic device 100 and that includes 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. In some embodiments, the modem processor may be an independent component. In some other embodiments, the modem processor may be independent of the processor 110, and is disposed in the same device as the mobile communication module 150 or another functional module.

The wireless communication module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The electronic device 100 may implement a display function through the GPU, the display screen 194, the application processor, and the like. The GPU is a microprocessor for image processing, and is connected to the display screen 194 and the application processor. The GPU is configured to: perform mathematical and geometric calculation, and render an image. The processor 110 may include one or more GPUs that execute program instructions to generate or change display information.

The display screen 194 is configured to display an image, a video, or the like. The display screen 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N display screens 194, where N is a positive integer greater than 1.

The electronic device 100 can implement a photographing function by using the ISP, the camera 193, the video codec, the GPU, the display screen 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more types of video codecs. Therefore, the electronic device 100 may play or record videos in a plurality of coding formats, for example, moving picture experts group (MPEG)-1, MPEG-2, MPEG-3, and MPEG-4.

The NPU is a neural network computing processing unit (Neural-network Processing Unit). By drawing on the experience of a structure of a biological neural network, for example, by drawing on the experience of a transmission mode between human brain neurons, the NPU quickly processes input information, and can further continuously perform self-learning. Applications such as intelligent cognition of the electronic device 100, for example, image recognition, facial recognition, speech recognition, and text understanding, may be implemented through the NPU.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 implements various function applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, and may further include a nonvolatile memory, for example, at least one magnetic disk storage device, a flash device, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB port 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display screen 194. There are a plurality of types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure intensity based on a capacitance change. When a touch operation is performed on the display screen 194, the electronic device 100 detects intensity of the touch operation through the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyro sensor 180B may be configured to determine a motion posture of the electronic device 100.

The barometric pressure sensor 180C is configured to measure barometric pressure.

The magnetic sensor 180D includes a Hall sensor.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance.

The optical proximity sensor 180G may include a light-emitting diode (LED) and an optical detector, for example, a photodiode.

The ambient light sensor 180L is configured to sense ambient light brightness.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J.

The touch sensor 180K is also referred to as a "touch panel". The touch sensor 180K may be disposed on the display screen 194, and the touch sensor 180K and the display screen 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided through the display screen 194. In some other embodiments, the touch sensor 180K may alternatively be disposed on a surface of the electronic device 100 at a location different from a location of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display screen 194, the motor 191 may also correspond to different vibration feedback effects. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

Figure 1B:
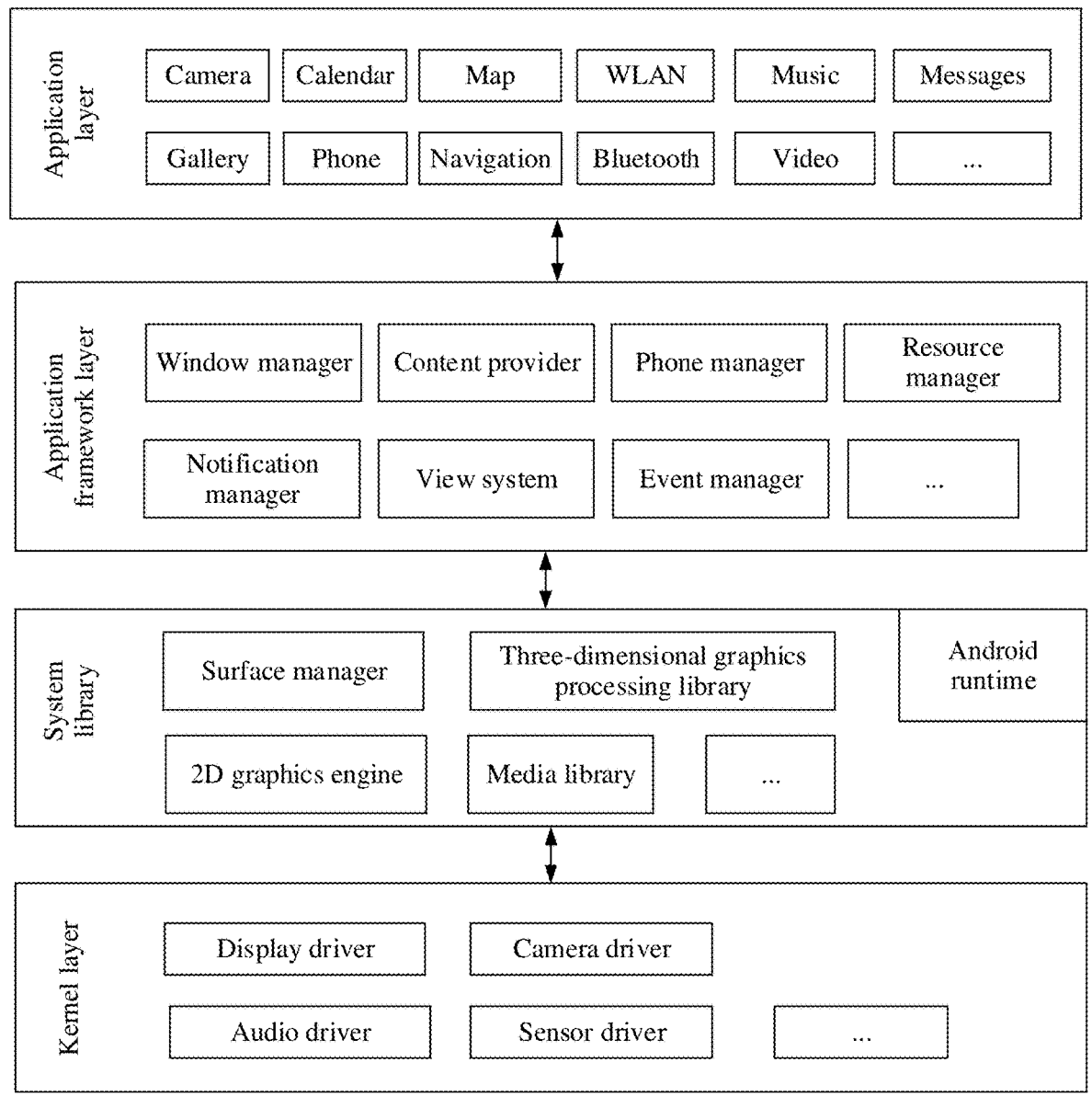
FIG. 1B is a block diagram of a software structure of an electronic device 100 according to an embodiment of this disclosure.

A software system of the electronic device 100 may use a layered architecture, an event-driven architecture, a microkernel architecture, a micro service architecture, or a cloud architecture. In this embodiment, an Android system of a layered architecture is used as an example to illustrate the software structure of the electronic device 100. FIG. 1B is a block diagram of a software structure of an electronic device 100 according to an embodiment of this disclosure.

It may be understood that the block diagram of the software structure shown in this embodiment constitutes no specific limitation on the block diagram of the software structure of the electronic device 100.

In a layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 1B, the application packages may include applications such as Camera, Gallery, Calendar, Phone, Map, Navigation, WLAN, Bluetooth, Music, Video, and Messages.

The application framework layer provides an application programming interface (API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a size of a display screen, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying a picture. The view system may be configured to construct an application. A display interface may include one or more views. For example, a display interface including a notification icon of Messages may include a text display view and a picture display view.

The phone manager is configured to provide a communication function of the electronic device 100, for example, management of a call status (including answering, declining, or the like).

The resource manager provides, for an application, various resources such as a localized character string, an icon, a picture, a layout file, and a video file.

The notification manager enables an application to display notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language, and a kernel library of Android.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support various audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The software system shown in FIG. 1B relates to application presentation (for example, a gallery and a file manager) using a sharing capability, an instant sharing module providing a sharing capability, and a print service and a print spooler service that provide a printing capability; a print framework, a WLAN service, and a Bluetooth service that are provided by the application framework layer; and a WLAN Bluetooth capability and a basic communication protocol that are provided by the kernel layer and a bottom layer.

The following describes an example of a working process of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. An example in which the touch operation is a touch operation, and a control corresponding to the touch operation is a control of a camera application icon is used. The camera application invokes an interface of the application framework layer to enable the camera application, then enables the camera driver by invoking the kernel layer, and captures a static image or a video through the 3D camera 193.

The following describes some application scenarios in the embodiments of this disclosure and user interface (UI) embodiments in each application scenario. It should be noted that the user interface mentioned in the embodiments of this disclosure may be understood as a window used to share and watch a video in this disclosure.

Application Scenario 1: Video Generation Based on Facial Recognition.

Many operation modes of information sharing between users are complicated. To improve controllability and user experience of status sharing, a video automatically generated by using an image may be used for status sharing. When a user is traveling in a tourist attraction, running in a suburb, or the like, the user may share a travel video of the user. In this case, the user may first obtain a facial recognition result by performing facial recognition, and further directly obtain, from pre-stored images based on the facial recognition result, an image that includes the user. This facilitates direct generation of a status video related to the user, and timely sharing of a current status of the user.

In this scenario, current environment information is obtained based on a location of a mobile phone user by using a sensor. For example, current weather information is cloudy, a temperature is 26 degrees, a current time is 10:40 a.m., a current geographical location is on a playground of an xx school, and a current motion status is running. The electronic device 100 builds, based on the provided current ambient environment information, a rough environment for generating a video, uses a facial recognition result as a leading role of the video, and uses an image selected from a terminal device to generate and share a status video in which the user is running on the playground under a cloudy weather condition with a temperature of approximately 26 degrees.

Based on the foregoing scenario, the following describes some UI embodiments implemented on the electronic device 100.

In the scenario of status video generation based on facial recognition, the electronic device 100 may receive a video generation instruction; in response to the video generation instruction, perform facial recognition to obtain a person image corresponding to facial recognition; in response to the video generation instruction, obtain current environment information and user physiological data by using the sensor 180 of the electronic device 100, and convert the current environment information and the user physiological data into text information; and input the text information and the obtained image information into a target generator network to obtain a target video. In addition, the detected current environment may be used as a background for generating the video.

The following provides detailed descriptions in the following aspects.

(1) How to Obtain Image Information

FIG. 2A(1) and FIG. 2A(2) are a schematic diagram of a group of user interfaces for receiving a video generation instruction according to an embodiment of this disclosure.

Specifically, as shown in FIG. 2A(1), the electronic device 100 may detect a touch operation of the user by using the touch sensor 180K (for example, the touch sensor 180K recognizes a pull-down operation performed by the user in a status bar of a window display area 201). In response to the touch operation, as shown in FIG. 2A(2), the electronic device 100 may display a complete status bar 202, and recognize a touch operation performed by the user on instant sharing 203 in the status bar. When the touch sensor 180K detects the touch operation performed on the instant sharing 203 in the status bar, a video generation instruction may be obtained.

Figure 2B:
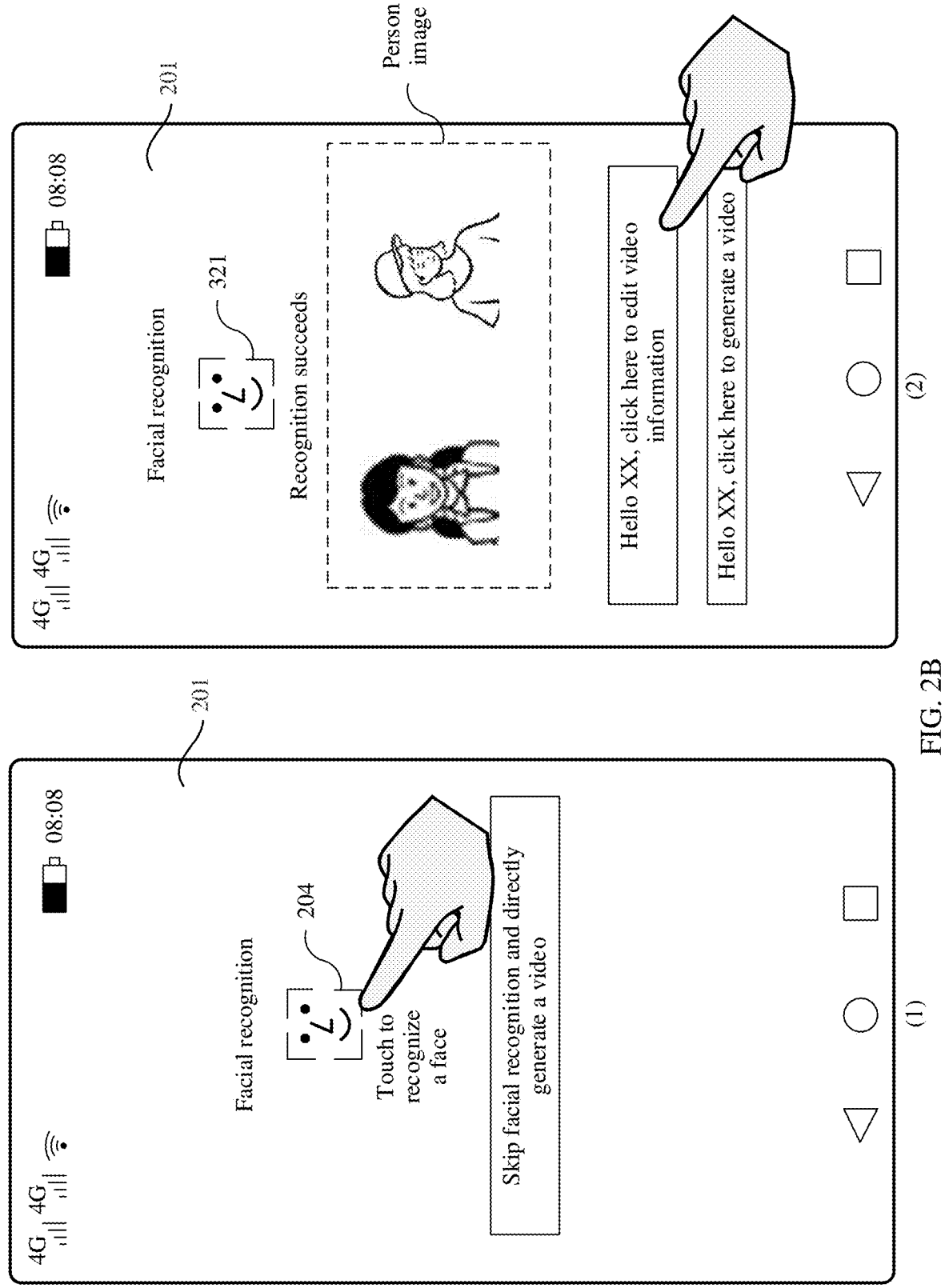
FIG. 2B is a schematic diagram of a group of user interfaces for obtaining image information according to an embodiment of this disclosure.

FIG. 2B is a schematic diagram of a group of user interfaces for obtaining image information according to an embodiment of this disclosure. In response to the touch operation performed on the instant sharing 203 in the status bar, a user interface of the electronic device 100 is shown in (1) in FIG. 2B. When the touch sensor 180K detects a touch operation performed by the user on a facial recognition control 204 shown in (1) in FIG. 2B, a facial recognition program may be started to perform facial recognition. That is, in response to the facial recognition request, facial recognition is performed by using the electronic device 100, and a facial recognition result is obtained. For example, the user taps to recognize a face, and the electronic device 100 may perform facial recognition in response to the video generation instruction and obtain a facial recognition result; and obtain, based on the facial recognition result, at least one image that matches the facial recognition result from a plurality of pre-stored images. As shown in (2) in FIG. 2B, the electronic device 100 obtains, based on the facial recognition result, at least one person image that matches the facial recognition result from a plurality of pre-stored images in the electronic device as the image information. For example, the electronic device 100 obtains two person images based on the facial recognition result.

Optionally, if at least one person image that matches the facial recognition result cannot be obtained based on the facial recognition result from the plurality of pre-stored images, a corresponding person image may be directly generated based on a face image during facial recognition as the image information.

Optionally, if a plurality of person images that match the facial recognition result are obtained based on the facial recognition result from the plurality of pre-stored images, a preset quantity of images may be selected from the plurality of person images based on a photographing time, image quality of the person images, and sizes of the person images. For example, there are 100 person images in the plurality of pre-stored images, and the electronic device selects, based on the photographing time, five person images closest to a current time as the image information to be input into the generator network.

Optionally, image quality of each of the obtained N images is greater than a preset threshold. During implementation of this embodiment, before the image information is obtained, image quality scoring needs to be performed on a to-be-selected image, and when an image quality score is less than the preset threshold, the image is not used to generate the video. The video is generated by using an image whose image quality is greater than the preset threshold, thereby ensuring that image quality of the target video finally generated by using the image is relatively high, so that viewing experience of the user is met.

Figure 2C:
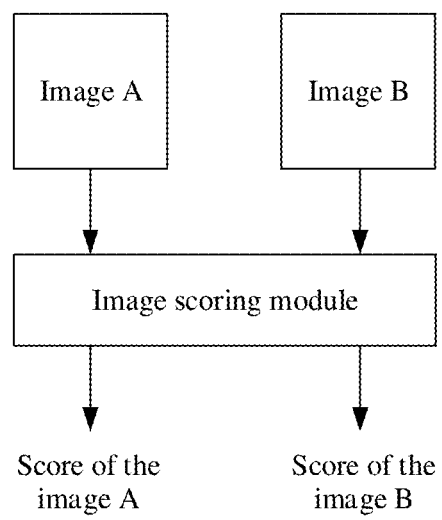
FIG. 2C is a schematic diagram of image quality scoring according to an embodiment of this disclosure.

Optionally, the electronic device 100 may be further configured to: perform image quality scoring on the obtained N images, to obtain an image quality scoring result corresponding to each of the N images; and perform image quality enhancement processing on an image whose image quality scoring result is less than a preset threshold, and update the image with enhanced image quality to the N images. The terminal device of the user or a cloud generally stores a specific quantity of images of the user, and a high-quality static image may be automatically selected in an aesthetic evaluation manner. For example, when quality of two images is far different, one image has high quality and definition, the other image is blurry, and specific details of the image cannot be captured. This is unfavorable for generation of a real-time status video. Therefore, an existing image scoring network may be used, and two images may be separately input into the image scoring network, to obtain image quality scores of the two images. A higher score indicates better quality of the image, and an image with a higher score is selected and input into the generator network as a static image, to improve video quality when a video is generated by using the image, thereby facilitating video generation and meeting viewing experience of the user. For example, FIG. 2C is a schematic diagram of image quality scoring according to an embodiment of this disclosure. As shown in FIG. 2C, two images that are an image A and an image B are obtained in response to the video generation instruction, and the obtained two images are separately input into an image quality scoring model, to obtain an image quality scoring result corresponding to each image. An image whose image quality scoring result is greater than the preset threshold is added to the image information as a video image.

A manner of recognizing a user operation is not limited to the foregoing listed manner of using the touch sensor 180K to recognize the touch operation. During specific implementation, there may be another manner of recognizing a user operation. For example, the electronic device 100 may further use an infrared sensor, a gesture sensor, or the like to recognize a gesture operation or the like of the user in front of a screen of the electronic device. This is not limited in this embodiment of this disclosure.

(2) How to Obtain Text Information

Specifically, the electronic device 100 may obtain the text information from one or more of text input information, voice input information, user preference information, user physiological data information, or current environment information in response to the video generation instruction, where the current environment information includes one or more of current weather information, current time information, or current geographical location information. The text information is a text obtained through keyword extraction by using one or more of the text input information, the voice input information, the user preference information, the user physiological data information, or the current environment information. One or more obtained keywords may include a person, a time, a place, an event, an action, or the like, which is used to indicate video content of a to-be-generated video. For example, the electronic device 100 may obtain text input information and voice input information by using user input, and obtain text information about one or more of a person, a time, a place, or an event from the text input information and the voice input information by performing keyword extraction. The electronic device 100 may further obtain preference information of the user by using a historical browsing record of the user, historical input information, and the like, and then obtain, from the user preference information, text information that is about a user interest, or that is most frequently browsed or searched by the user or most frequently appears. The electronic device 100 may further obtain user physiological data information or current environment information by using the sensor 180, and then obtain text information about one or more of a person, a time, a place, an event, a motion status, or a psychological status by performing keyword extraction. The current environment information includes one or more of current weather information, current time information, current geographical location information, or a current motion status.

Figure 2D:
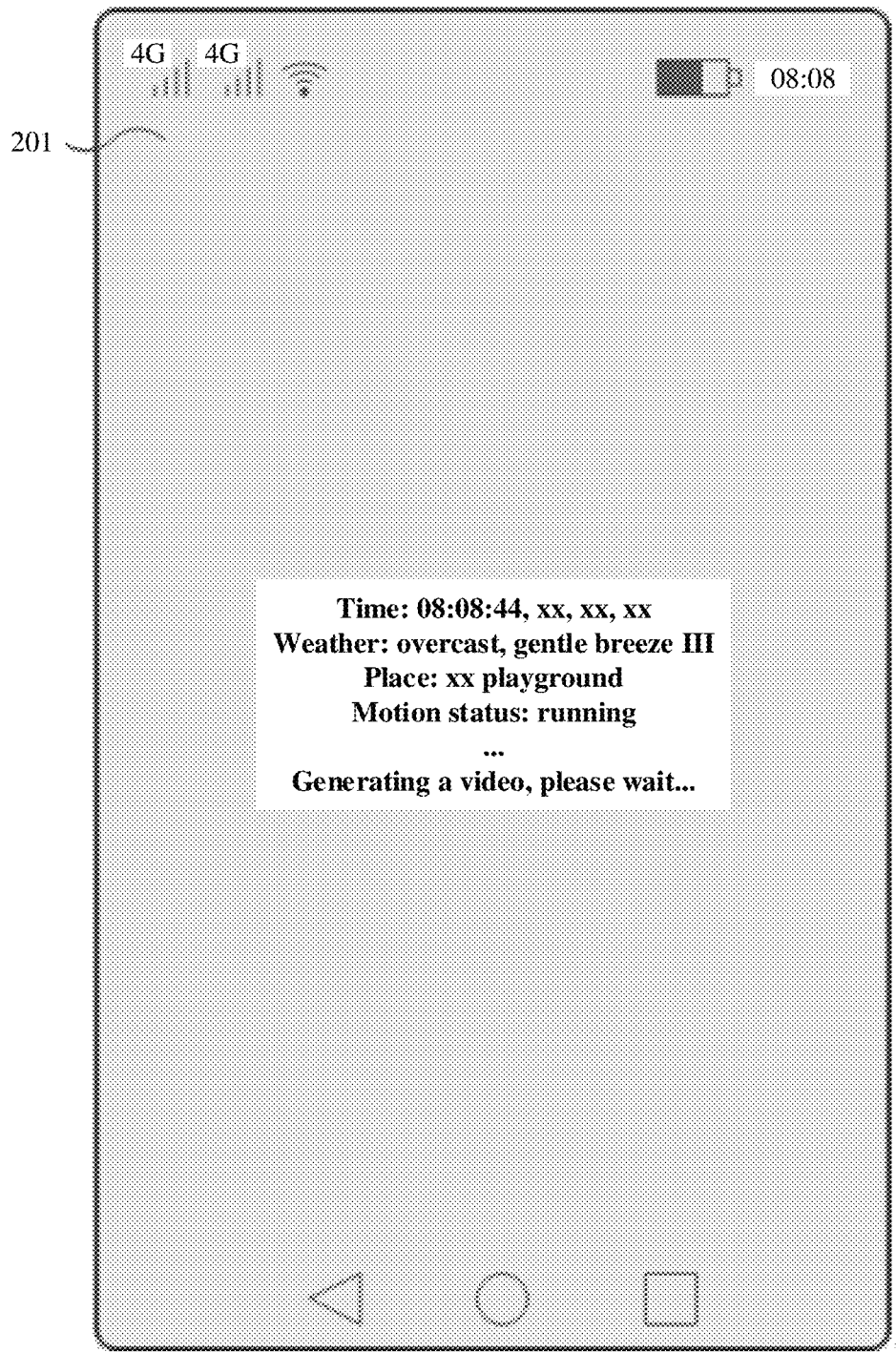
FIG. 2D is a schematic diagram of a user interface for displaying text information according to an embodiment of this disclosure.

For example, FIG. 2D is a schematic diagram of a user interface for displaying text information according to an embodiment of this disclosure. As shown in FIG. 2D, the electronic device 100 may obtain current geographical location information by using a GPS positioning system; further obtain, based on the current time information and the current geographical location information, current weather information corresponding to the location; and further obtain physiological data of the user. That is, the electronic device 100 may obtain text information of a time, weather, a place, and a motion status based on current weather information being cloudy, a temperature being 26 degrees, a current time being 10:40 a.m., a current geographical location being an xx playground, and a current motion status being running. The electronic device 100 uses multi-modal information to extract the text information to assist in video generation, so that the generated video may reflect a current user status (for example, a weather environment in the generated video is the same as a weather environment in which the user is currently located). The multi-modal information may include a text, preference information, environment information, and the like. For example, when the user does not or cannot perform manual or voice input, only current environment information obtained by the sensor or a preference extracted from historical interaction information may also be relied on and used as the input text information, which is used together with the input image information to generate the target video.

It should be noted that, in a video generation process, an order of obtaining the text information and the image information in response to the video generation instruction is not specifically limited. For example, the text information may be first obtained, and then the image information may be obtained. Alternatively, the image information may be first obtained, and then the text information may be obtained. Alternatively, the text information and the image information may be simultaneously obtained.

A manner of obtaining text information is not limited to the foregoing listed manner of obtaining the text information in response to the video generation instruction. During specific implementation, there may be another manner of obtaining text information. For example, the electronic device 100 may further extract, through image recognition, text information about one or more of a person, a time, a place, or an event from the obtained image information. This is not limited in this embodiment of this disclosure.

(3) How to Generate a Video

Specifically, the electronic device 100 extracts, based on the one or more keywords, an image feature that is in each of the N images and that corresponds to the one or more keywords; and inputs the one or more keywords and image features of the N images into a target generator network to generate a target video, where the target video includes M images, the M images are images that are generated based on the image features of the N images and that correspond to the one or more keywords, and M is a positive integer greater than 1. That is, the obtained text information and the obtained image information are input into the target generator network to obtain the target video, and the target video is used to describe the text information. The video is generated by jointly using a text and the images, so that for the generated video, the input image information may be adjusted based on the input text information, thereby greatly enriching the video content, and avoiding a video generated by directly stacking a plurality of images on an existing terminal device, where the video is limited to switching-type showing in a form of slides and lacks richness of content. For example, the electronic device 100 obtains an image of a user A drinking milk tea and text information of walking on a playground. The electronic device 100 may extract an image feature of the user A in the image based on the text information, generate M images by using the generator network, and synthesize a target video in which the user A is walking on the playground.

Optionally, a first spatial variable that is in vector space and that corresponds to each of the one or more keywords is extracted; second spatial variables that are in vector space and that respectively correspond to the image features of the N images are extracted; and the first spatial variable and the second spatial variables are input into the target generator network to generate the target video. During implementation of this embodiment, first, the first spatial variable corresponding to the text information and a second spatial variable of the image feature of each image in the image information may be separately extracted. The first spatial variable may be a word vector that is in latent space and that identifies the text information. The second spatial variable of each image may be a vector that is in latent space and that identifies the image feature of the image. Spatial vector extraction helps the generator network better generate the target video.

For example, the first spatial variable that is in vector space and that corresponds to each of the one or more keywords is extracted by using the Word2Vec model, and the second spatial variables that are in vector space and that respectively correspond to the image features of the N images are extracted by using a downsampling convolutional network. First, for an input image, a downsampling convolutional network is used to extract a spatial vector of the image that is in latent space; and for input text information, the Word2Vec model is used to extract a spatial vector of the text that is in latent space. The spatial vector of the image that is in latent space and the spatial vector of the text that is in latent space are used as input to a video generator network to generate a video.

Optionally, after the target video is generated, target audio information that matches at least one of the one or more keywords may be further obtained, and the target audio information is added to the target video, to obtain a video with sound, thereby meeting joint requirements of the user in vision and hearing.

Figure 2E:
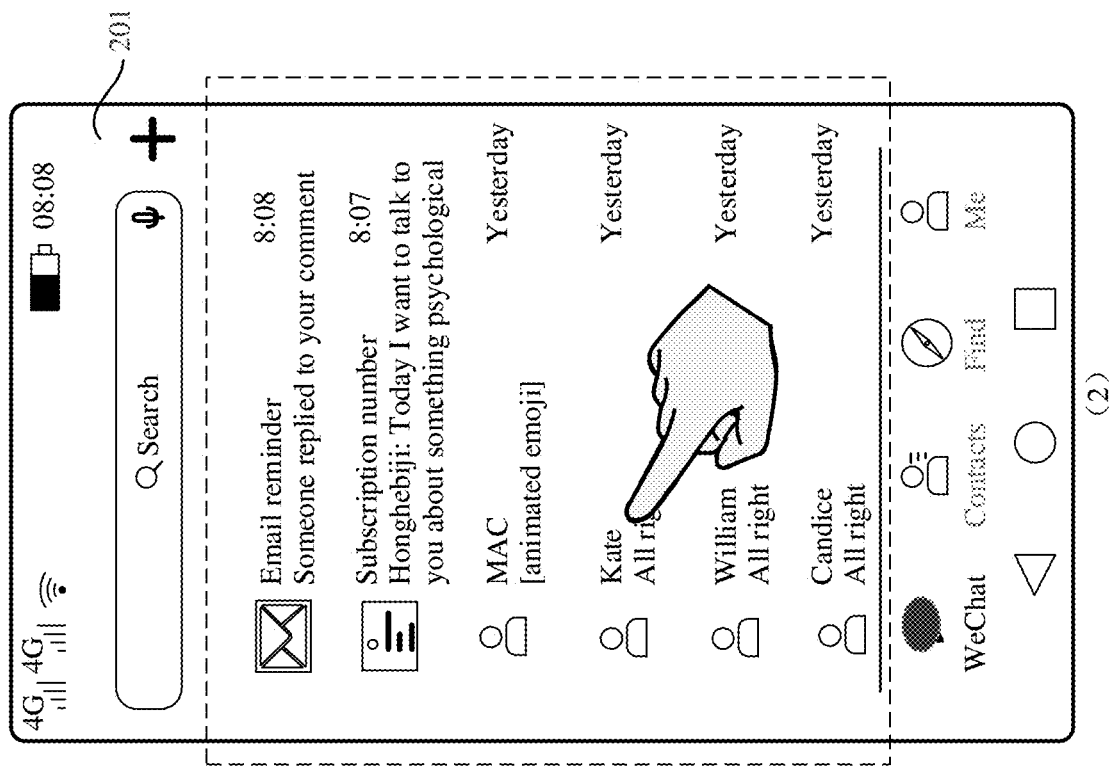
FIG. 2E is a group of user interfaces for sharing a generated video with a friend according to an embodiment of this disclosure.
Figure 2E:
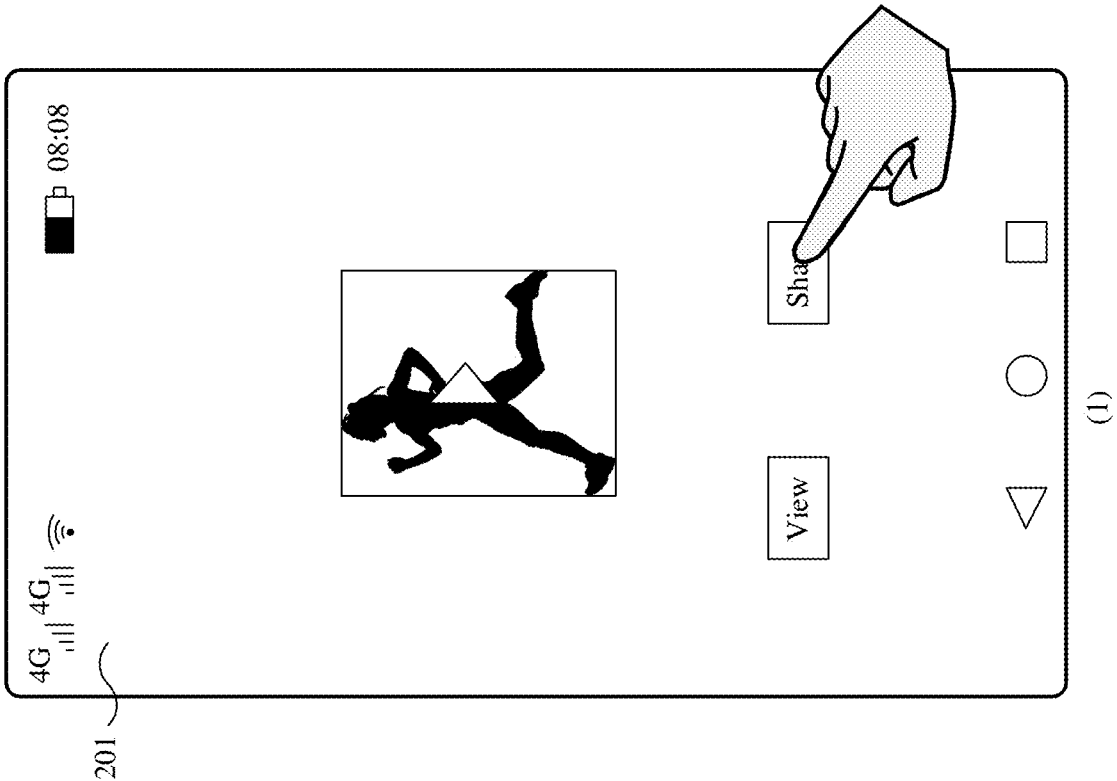

Optionally, a video sharing instruction is received, and the target video is sent to a target device in response to the video sharing instruction. The electronic device 100 shares the generated target video with the target terminal device, to promote friendly development of a social platform, and improve life and friend-making experience of the user. FIG. 2E is a group of user interfaces for sharing a generated video with a friend according to an embodiment of this disclosure. As shown in (1) in FIG. 2E, the electronic device 100 uses the generator network to generate a target video by using the text information of the time, the weather, the place, and the motion status obtained in FIG. 2D and the image information obtained in FIG. 2B, and the video may be viewed or shared. As shown in (2) in FIG. 2E, the user interface may be a status video sharing interface provided by a chat tool. Not limited thereto, the user interface may alternatively be a status video sharing interface provided by another application, and the another application may be social software or the like.

Figure 2F:
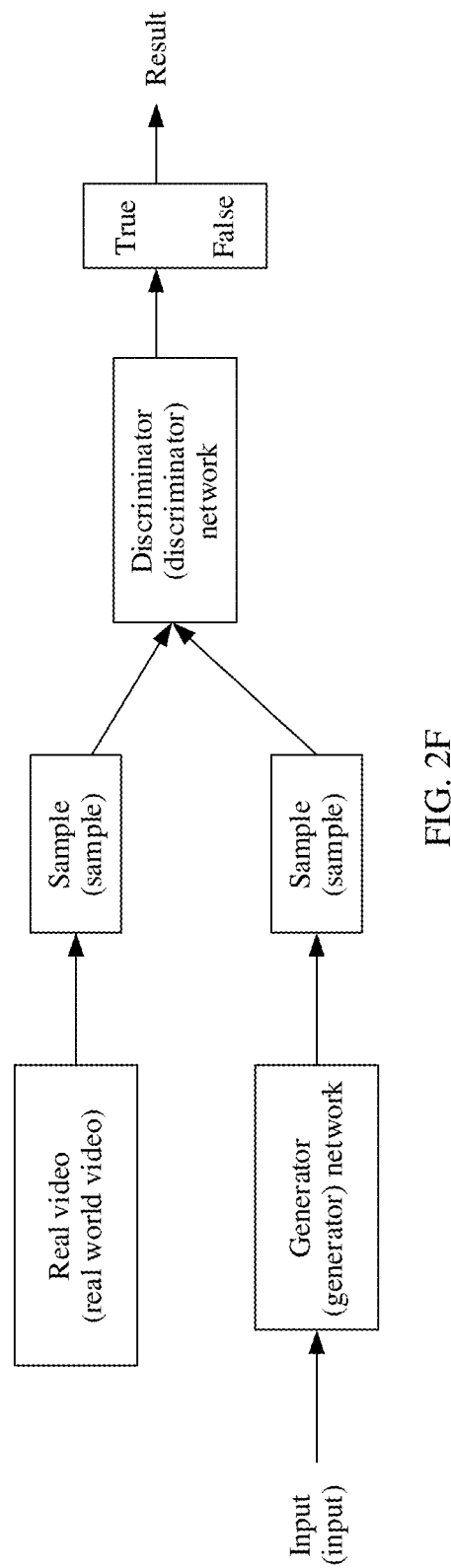
FIG. 2F is a schematic flowchart of generator network training according to an embodiment of this disclosure.

Optionally, before the target video is generated, the electronic device further needs to train the target generator network. That is, sample text information, sample image information, and a real video data set are obtained, and a discriminator network and a video generation-based generator network are built; the sample text information and the sample image information are input into the generator network to obtain a sample video; the sample video and the real video data set are used as input to the discriminator network to obtain a discrimination loss result; and the generator network is trained based on the discrimination loss result to obtain the target generator network. The discrimination loss result is true when the sample video belongs to the real video data set. The generator network and the discriminator network are trained by using sample data. FIG. 2F is a schematic flowchart of generator network training according to an embodiment of this disclosure. As shown in FIG. 2F, a video is generated based on the sample data by using the generator network, and then <generated video, and real video> is input into a discriminator. The real video is a video obtained in a real world. The discriminator determines a source of the input, and if the source of the input is the generated video, the discriminator determines the input as false 0; or otherwise, the discriminator determines the input as true 1. In such a repeated adversarial training manner, content of the generated video can be further standardized, and authenticity of the generated video and quality of the generated video can be gradually improved, thereby facilitating sharing of a real-time status video.

Application Scenario 2: Video Generation Based on User Input

A user A has some old photos on hand, but regrets that some things are not completed at that time, and wants to experience the picture sense again. In this case, the user A may describe the pictures at that time by performing voice input or text input. For example, the user A has an old photo of a grandson on hand, and the user A wants to see appearance of the grandson playing football. Then, the user A says "My grandson is playing football carefree on green grass" to a terminal device. In this case, a status video generation system automatically extracts keywords "green grass", "playing football", and "grandson", and may generate, based on the photo of the grandson on the terminal device of the user A, a video that meets a requirement of the user A.

Based on the foregoing scenario, the following describes some UI embodiments implemented on the electronic device 100.

In the scenario of status video generation based on user input, the electronic device 100 may receive a video generation instruction; obtain image information in response to the video generation instruction; in response to the video generation instruction, obtain current environment information by using the sensor 180 of the electronic device 100, and convert the current environment information into text information; and input the text information and the obtained image information into a target generator network to obtain a target video. In addition, the detected current environment information may be used as a background for generating the video.

Figure 2G:
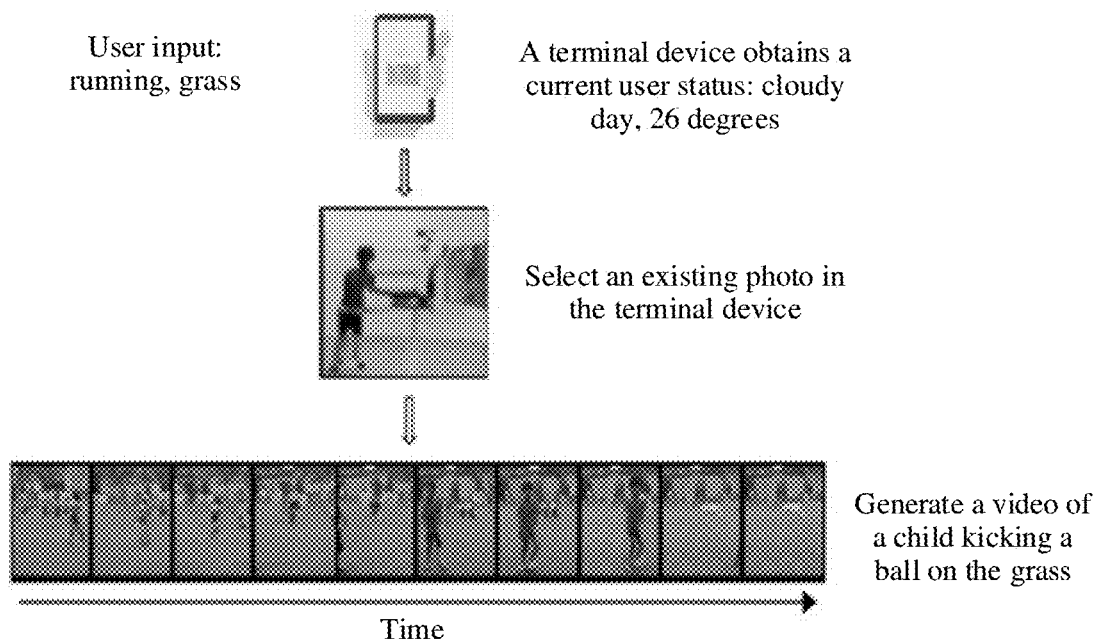
FIG. 2G is a schematic flowchart of video generation according to an embodiment of this disclosure.

In this scenario, FIG. 2G is a schematic flowchart of video generation according to an embodiment of this disclosure. As shown in FIG. 2G, text information is obtained based on text input information and voice input information of a user. For example, a person is a grandson, a place is green grass, and an event is playing football. The electronic device 100 builds, based on the voice input of the user, a rough environment for generating a video, uses the "grandson" as a leading role of the video, and uses an image selected from a terminal device to generate a status video in which the grandson is playing football carefree on green grass.

The following provides detailed descriptions in the following aspects.

(1) How to Obtain Image Information

Specifically, the electronic device obtains, in response to the video generation instruction, an image corresponding to at least one of the one or more keywords from a plurality of pre-stored images. That is, the electronic device may obtain, based on text information, image information related to the text information. For example, when the user visits the Palace Museum, an image related to the Palace Museum may be obtained and used to synthesize a target video, to facilitate real-time sharing of a life status by the user. When the image information is obtained, an image of a corresponding place may alternatively be obtained based on person information entered by the user, to generate a target video, so that a user requirement is met. For example, the user enters "Xiaoming is playing football on a playground", and at least one related image of keywords "Xiaoming", "playground", and "football" may be obtained and used to synthesize a target video.

Figure 2H:
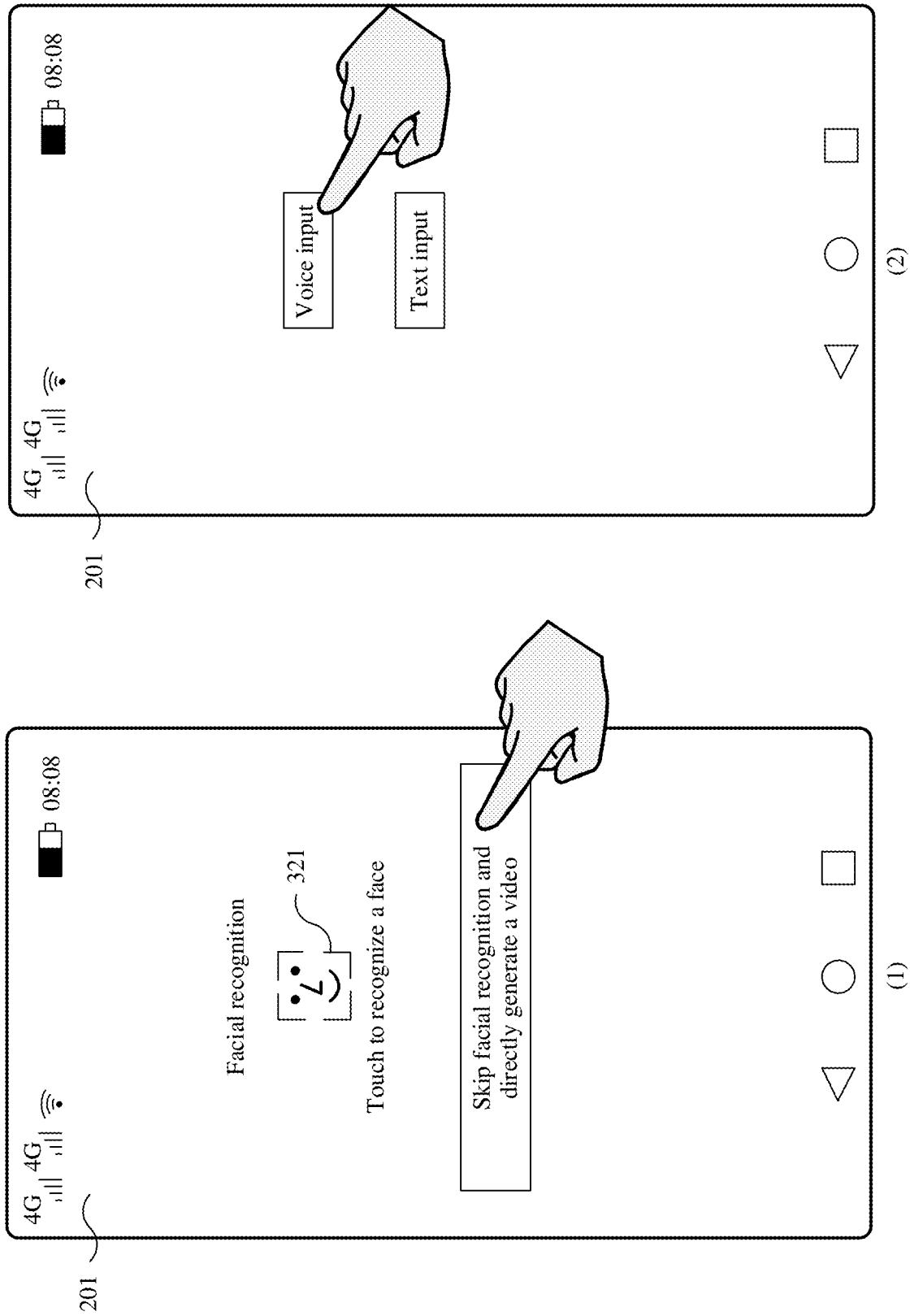
FIG. 2H is a group of user interfaces for obtaining text information according to an embodiment of this disclosure.

In this scenario, FIG. 2H is a group of user interfaces for obtaining text information according to an embodiment of this disclosure.

Figure 2I:
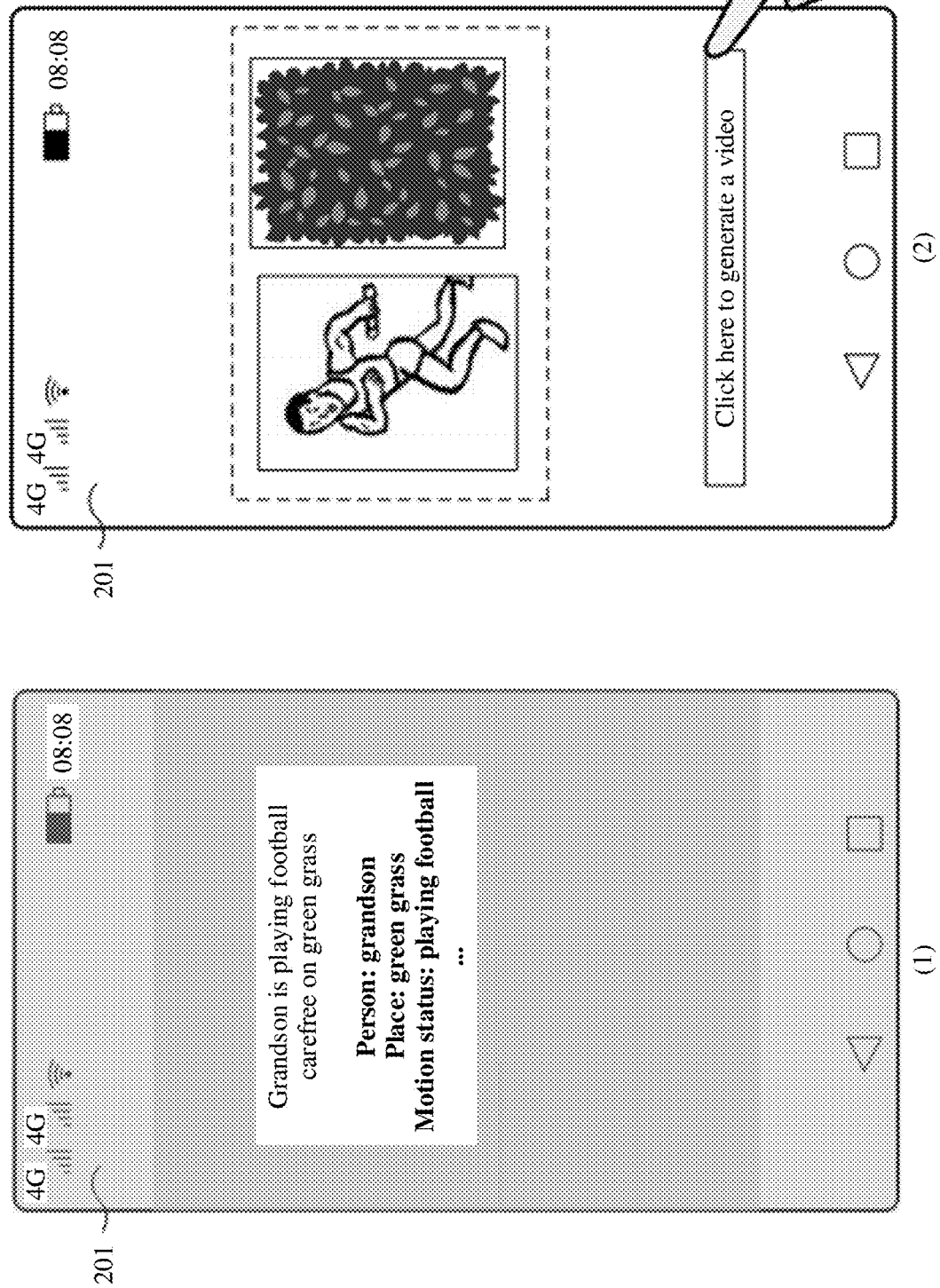
FIG. 2I is a group of user interfaces for obtaining image information based on a keyword according to an embodiment of this disclosure.

As shown in (1) in FIG. 2H, when the touch sensor 180K detects a touch operation performed by the user on a video generation control (for example, skip facial recognition and directly generate a video) in a window display area 201, the electronic device 100 may respond to the instruction and switch to an interface shown in (2) in FIG. 2H. When the touch sensor 180K detects a touch operation performed by the user on a voice input control, the electronic device 100 may receive voice input "My grandson is playing football carefree on green grass" of the user in response to the touch operation. Text information about a person, a place, and an event may be obtained based on the voice input, and keywords such as "grandson", "grass", and "playing football" may be obtained based on the text information. FIG. 2I is a group of user interfaces for obtaining image information based on a keyword according to an embodiment of this disclosure. As shown in (1) in FIG. 2I, keywords "grandson" and "grass" are obtained based on the text information. Further, as shown in (2) in FIG. 2I, the electronic device 100 may obtain, based on the two keywords "grandson" and "grass", at least one image corresponding to the keywords from a plurality of pre-stored images.

Optionally, the video generation instruction includes at least one image label, and each image label in the at least one image label corresponds to at least one of a plurality of pre-stored images; and the obtaining image information in response to the video generation instruction includes: obtaining, in response to the video generation instruction and based on the at least one image label, at least one image corresponding to each image label in the at least one image label from the plurality of pre-stored images. During implementation of this embodiment, when obtaining the image information, the electronic device may obtain at least one corresponding image by using the at least one image label carried in the video generation instruction, to generate a target video. When the user wants to generate an interesting video by using some images, images that the user is interested in or requires may be directly obtained through screening, to generate a video, so that a viewing requirement of the user is met. For example, the user may select an image label "cat", and after a plurality of images of the cat are obtained, a dynamic video with the cat as a leading role is generated by using the plurality of images of the cat together with text information. For another example, the user may further select an image label "Xiaoming in childhood", and after a plurality of images of Xiaoming in childhood are obtained, a dynamic video about childhood of Xiaoming is generated by using the plurality of images of Xiaoming in childhood together with text information.

It should be noted that, for a related description of how to obtain image information, correspondingly refer to the related description of how to obtain image information in the application scenario 1.

(2) How to Obtain Text Information

Specifically, the text information is obtained from one or more of text input information, voice input information, user preference information, user physiological data information, or current environment information in response to the video generation instruction. As shown in (1) in FIG. 2I, one or more keywords are obtained based on voice input information of the user. For example, a person is a grandson, a place is green grass, and an event is playing football.

It should be noted that, for a related description of how to obtain text information, correspondingly refer to the related description of how to obtain text information in the application scenario 1.

(3) How to Generate a Video

Figure 2J:
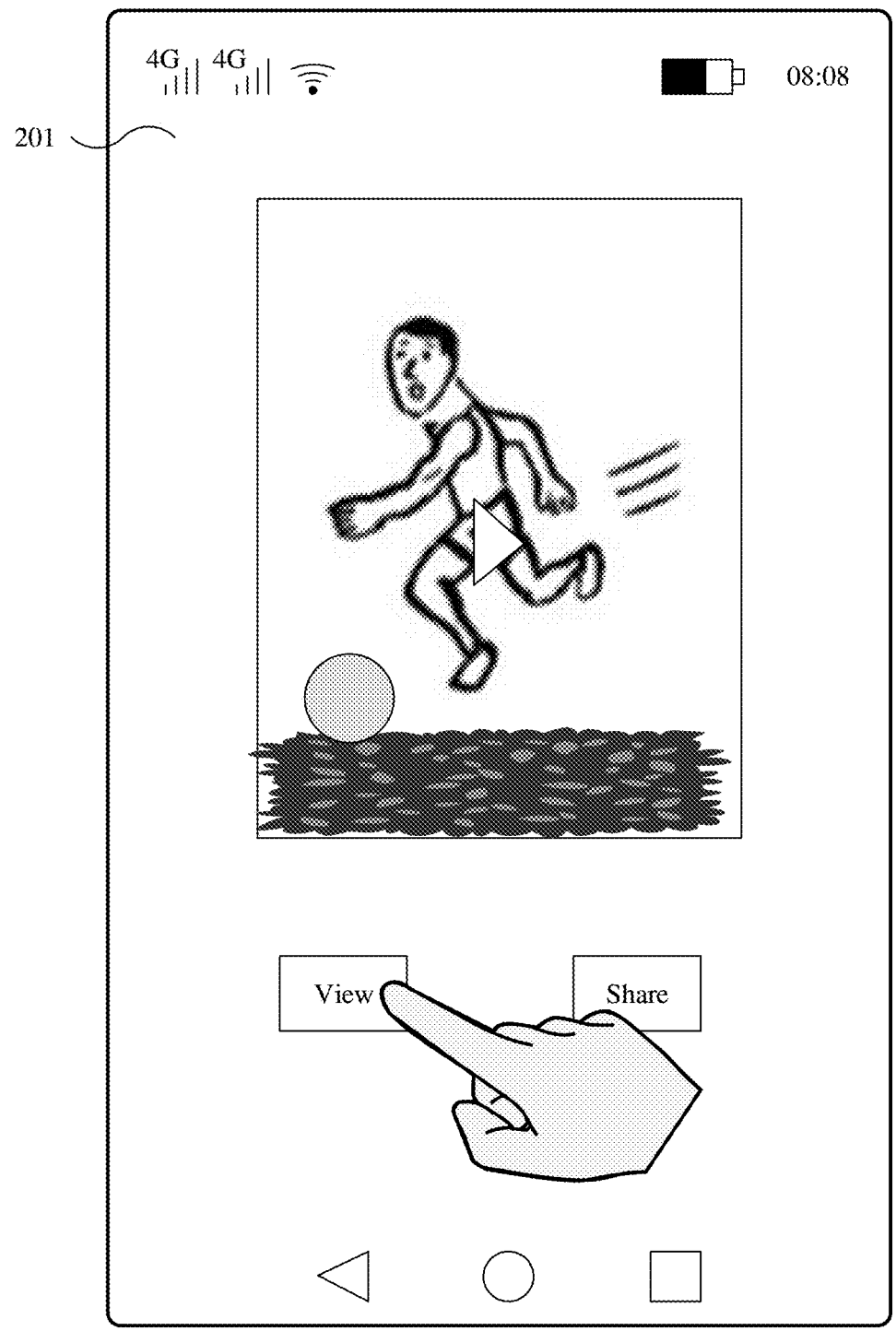
FIG. 2J is a user interface for generating a video according to an embodiment of this disclosure.

Specifically, the electronic device 100 uses a generator network as a core module for video generation. The generator network may consider semantic information of a previous frame and a next frame by using a recurrent neural network (RNN), to promote inter-frame stability of a generated video. The generator network is a part of a generative adversarial network. A generator samples noise distribution, and uses the noise distribution as input. A discriminator determines a source of input data. Such an adversarial mode can well promote progress of both networks in the entire adversarial network. FIG. 2J is a user interface for generating a video according to an embodiment of this disclosure. As shown in FIG. 2J, after the electronic device 100 inputs one or more obtained keywords and image features corresponding to the keywords into the generator network, a video in which the grandson is playing football on the grass is generated, and the user may view or share the video on the interface shown in FIG. 2J.

It should be noted that, for a related description of how to generate a video, correspondingly refer to the related description of how to generate a video in the application scenario 1.

Application Scenario 3: Video Generation Based on a User Preference

The electronic device 100 may obtain behavior information of a user on a terminal device, and extract a valid keyword, to generate a video. For example, a user likes traveling very much, and frequently mentions, in chatting with a friend, a wish to travel to "Bali" or frequently searches for information about "Bali traveling" in a browser. In this case, the electronic device 100 may generate, based on the keyword information, a scene in which the user travels in Bali.

Based on the foregoing scenario, the following describes some UI embodiments implemented on the electronic device 100.

Figure 2K:
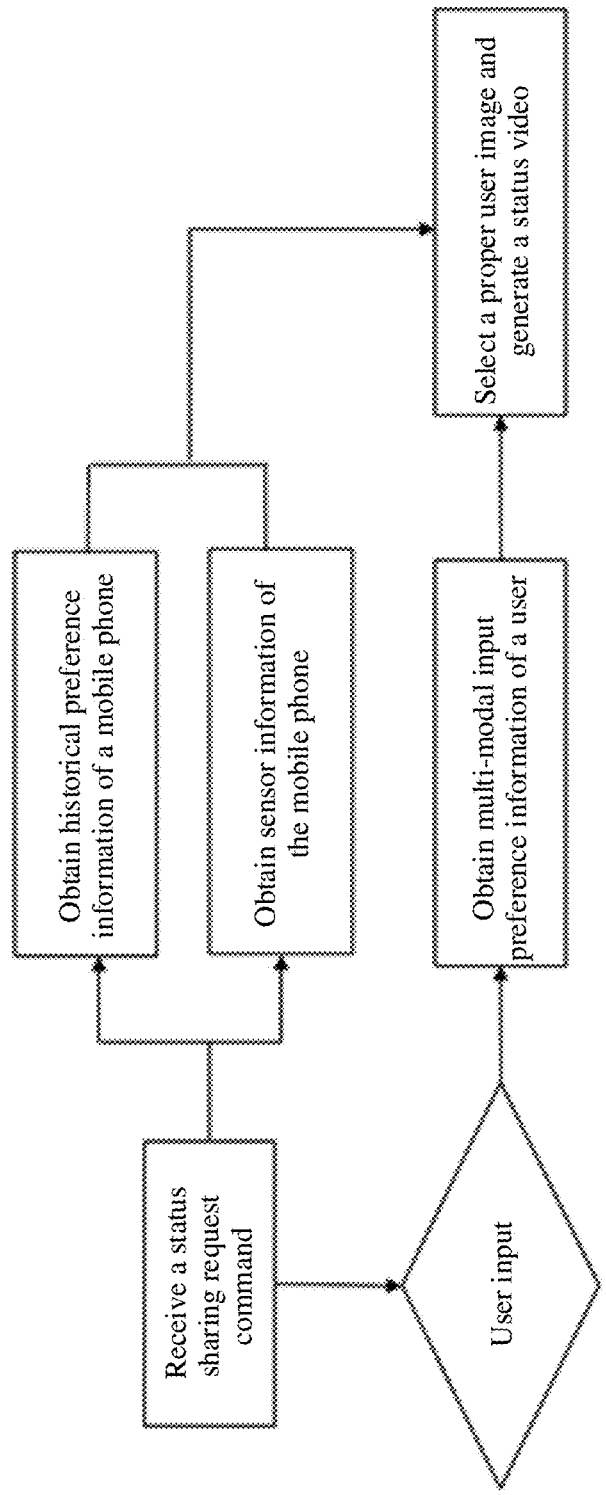
FIG. 2K is a schematic flowchart of video generation based on a user preference according to an embodiment of this disclosure.

In the scenario of status video generation based on a user preference, FIG. 2K is a schematic flowchart of video generation based on a user preference according to an embodiment of this disclosure. As shown in FIG. 2K, the electronic device 100 may receive a video generation instruction; obtain text information and image information from historical preference information of the user and current environment information in response to the video generation instruction; or in response to the video generation instruction, obtain preference information entered by the user, and convert the preference information into text information; and input the text information and the obtained image information into a target generator network to obtain a target video. The detected current environment information may be used as a background for generating the video.

The following provides detailed descriptions in the following aspects.

(1) How to Obtain Image Information

Figure 2L:
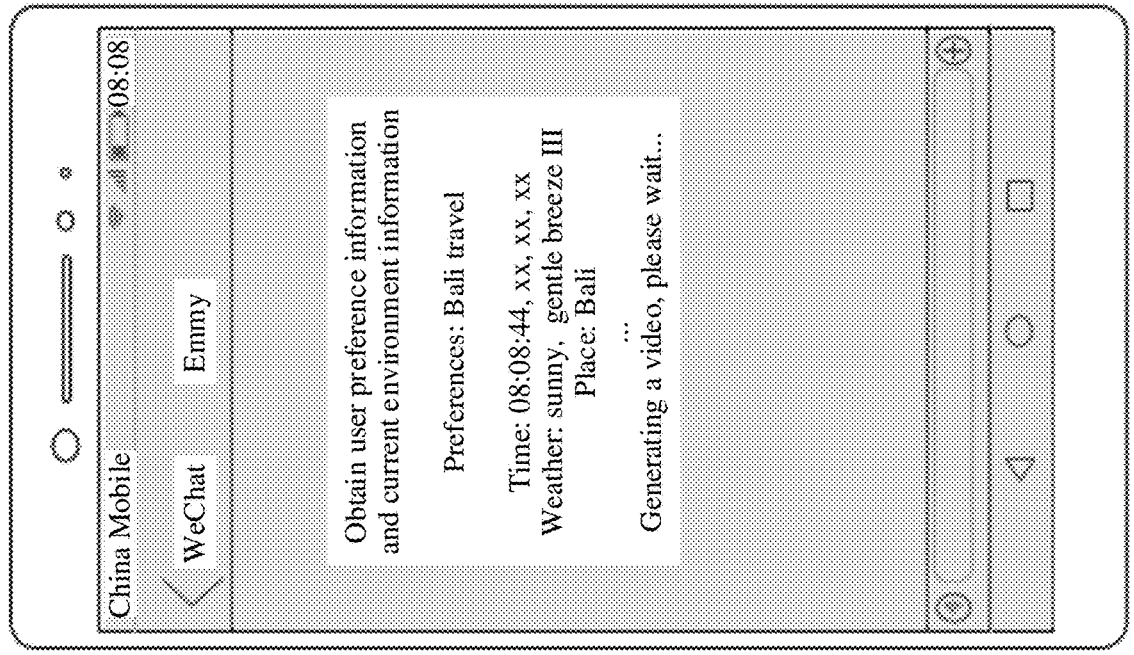
FIG. 2L is another group of user interfaces for obtaining text information according to an embodiment of this disclosure.
Figure 2L:
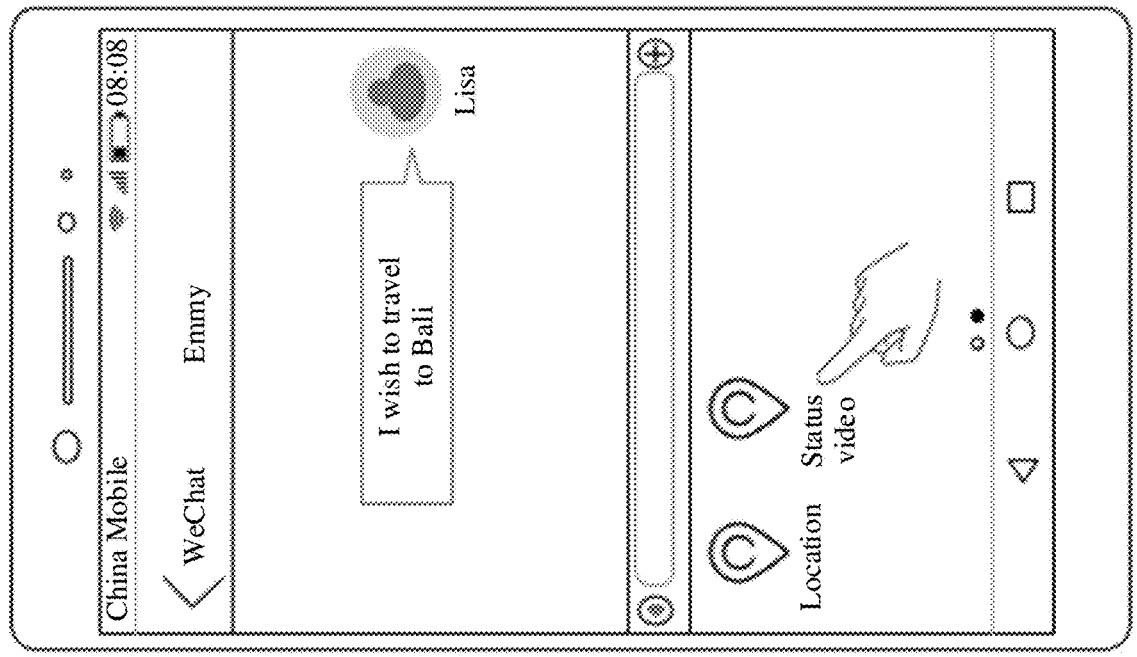

Specifically, in the current scenario, the user does not perform related input for video content of a to-be-generated video. Therefore, to enrich the video content, the electronic device 100 may use a user preference as input information of the video. FIG. 2L is another group of user interfaces for obtaining text information according to an embodiment of this disclosure. As shown in (1) in FIG. 2L, the electronic device 100 may detect a touch operation of the user by using the touch sensor 180K (for example, the touch sensor 180K recognizes a tap operation performed by the user on a status video in a window display area 202). In response to the touch operation, the electronic device may start to generate a video. As shown in (2) in FIG. 2L, the electronic device 100 may obtain user preference information and current environment information in response to the tap operation. The text information is obtained from the foregoing information. That is, the one or more keywords are extracted, and an image corresponding to at least one keyword is obtained based on the one or more keywords. For example, an image about Bali is obtained based on a keyword "Bali", and weather information of Bali is obtained based on a current time, so that a weather environment of Bali in a generated video is consistent with a current weather environment of Bali.

It should be noted that, for a related description of how to obtain image information, correspondingly refer to the related description of how to obtain image information in the application scenario 1 or 2.

(2) How to Obtain Text Information

Specifically, the electronic device obtains the preference information of the user, and extracts one or more keywords from the user preference information and the current environment information when receiving no other input from the user, to obtain input text information for a video. For example, as shown in (2) in FIG. 2L, the electronic device obtains information that the user likes to travel to Bali, and further obtains at least one keyword related to a time, a place, and a person with reference to a current time and weather of Bali.

It should be noted that, for a related description of how to obtain text information, correspondingly refer to the related description of how to obtain text information in the application scenario 1 or 2.

(3) How to Generate a Video

Figure 2M:
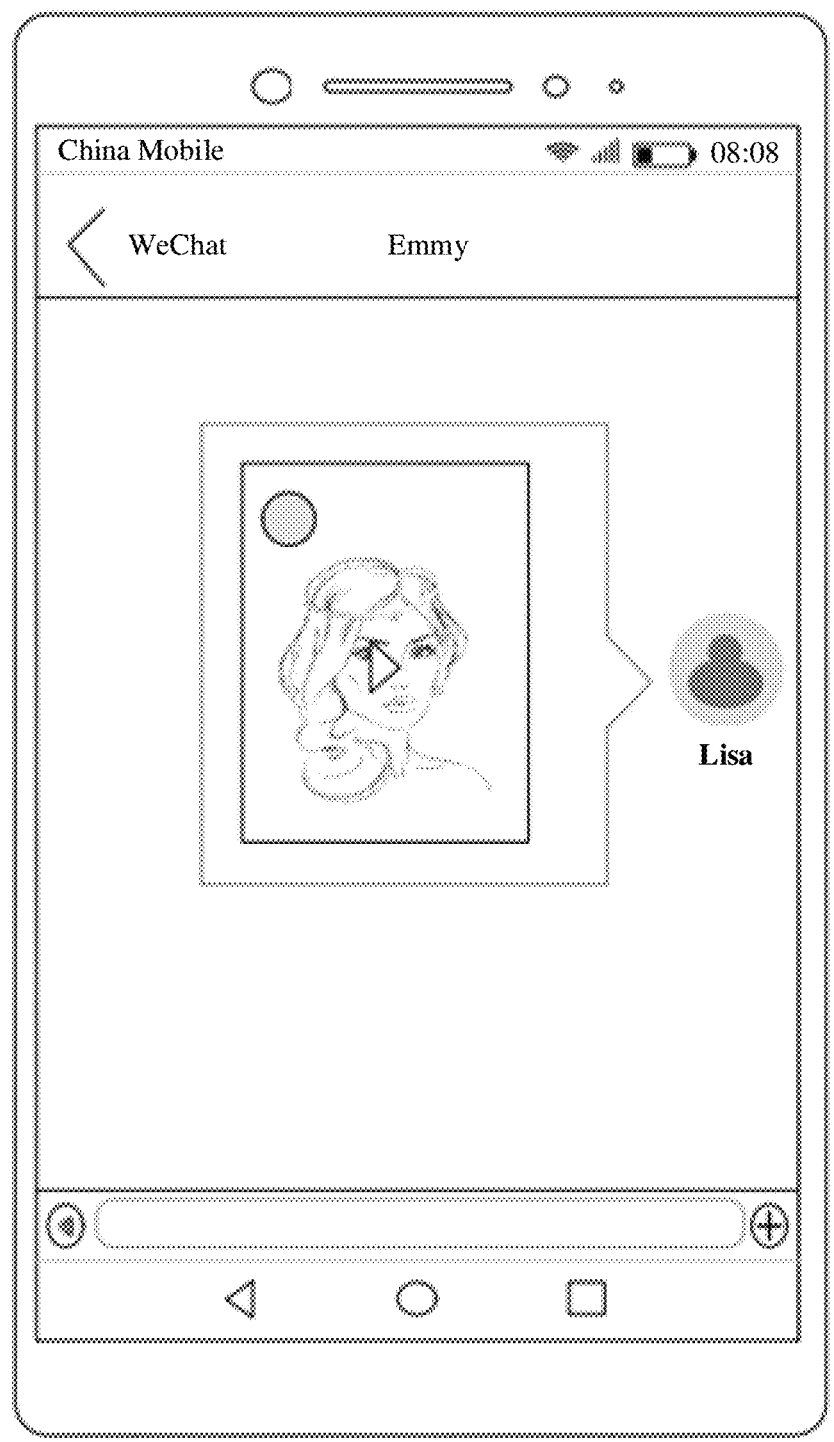
FIG. 2M is another user interface for generating a video according to an embodiment of this disclosure.

Specifically, the electronic device 100 inputs the obtained text information and the obtained image information into a target generator network to obtain a target video, and the target video is used to describe the text information. A first spatial variable of each image in the image information is extracted based on the text information, and the first spatial variable of each image is used to identify an image feature that corresponds to the text information and that is in the image. For example, FIG. 2M is another user interface for generating a video according to an embodiment of this disclosure. As shown in FIG. 2M, the electronic device generates, based on the obtained text information and the obtained image information, a video in which the user is traveling in Bali. The user Lisa may send the video to a friend Emmy, thereby enriching a form of communication between friends. The electronic device may even generate a video in which the user is traveling in Bali with the friend, to compensate for a regret of not being able to travel with the friend.

It should be noted that, for a related description of how to obtain a generated video, correspondingly refer to the related description of how to generate a video in the application scenario 1 or 2.

Therefore, by using a text, voice, sensor information of the electronic device, historical preference information, and a small quantity of images, a video is generated for sharing. The historical preference information is extracted from user interaction information of the terminal device or a browser search record, and mainly refers to a user interest. A status of the current user may be effectively described by using multi-modal information input, to constrain a to-be-generated video. Compared with sharing of geographical location or orientation information, sharing of a status video can meet user requirements in both vision and hearing, and can bring richer experience to the user.

It should be noted that the foregoing three application scenarios are merely some example implementations in the embodiments of this disclosure, and the application scenarios in the embodiments of this disclosure include but are not limited to the foregoing application scenarios.

Figure 3A:
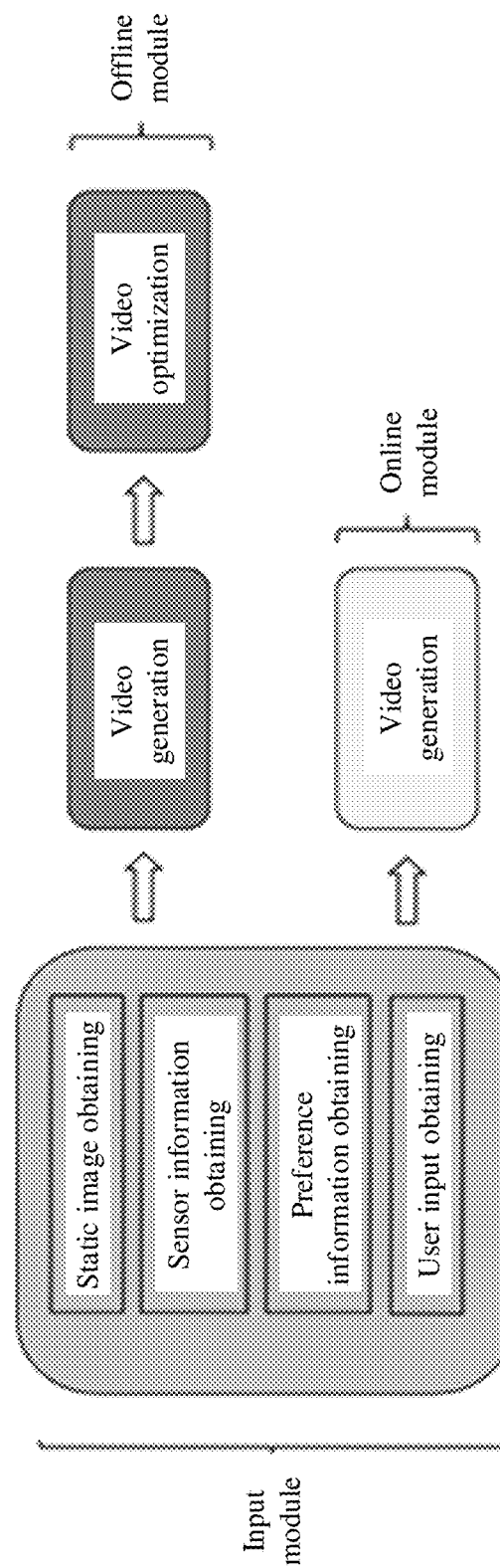
FIG. 3A is a schematic diagram of a structure of a video generation apparatus according to an embodiment of this disclosure.

Based on the electronic device and the application scenarios, an embodiment of this disclosure provides a video generation apparatus applied to the electronic device in FIG. 1A. FIG. 3A is a schematic diagram of a structure of a video generation apparatus according to an embodiment of this disclosure. As shown in FIG. 3A, the video generation apparatus may include three modules: an input module, an offline module, and an online module. The input module includes a static image obtaining submodule, a sensor information obtaining submodule, a preference information obtaining submodule, and a user input obtaining submodule. The offline module includes a video generation submodule and a video optimization submodule. It should be noted that a terminal device mentioned in the following embodiments is equivalent to the electronic device 100 in this disclosure.

(1) Input Module

The input module provides original input for a generator network that generates a video, and assists the generator network in completing video generation. Explicit input condition information and a high-quality static image are helpful to generate a better real-time status video. A user can add, based on a subjective wish of the user, a desired status video element to enrich video content, and can present the desired status video element in a text or voice.

Static image obtaining submodule: Generally, a terminal device of the user has many photos to select from, and when the user wants to generate a real-time status video that includes an activity of a person, the terminal device automatically selects a photo that includes the user. The terminal device may alternatively select a high-quality image by using a method such as image quality evaluation. For example, some images are blurry due to a reason such as a camera shake during photographing, or a photo result is poor due to low light. In this case, such an image should be filtered out and not used as input for video generation.

Sensor information obtaining submodule: The terminal device includes many sensor elements. For example, a GPS position sensor can obtain geographical location information of the user, a temperature sensor can obtain temperature information around the user, and a barometric pressure sensor can obtain a relative altitude of the user. There are many more sensors that have a good function of providing real-time information around the user.

Preference information obtaining submodule: obtains historical interaction information of the user on the terminal device, and extracts historical preference information of the user based on the interaction information. For example, applications on the terminal device may extract a large amount of user interaction information, such as a chat record and a search record in social software. Alternatively, user search information is collected from a browser, to extract user interest information.

User input obtaining submodule: User input may be in a voice form or a text form. If the user input is voice, a voice assistant function of a mobile phone may be used to extract a keyword, the keyword may be converted into a text, and the text may be stored and subsequently combined with text input to obtain final input. By performing text input, the user may enter some keywords of a to-be-generated real-time status on the terminal device, to describe a scene of a to-be-generated status video, such as a time, a person, a place, and an event.

(2) Offline Module

The offline module is mainly configured to perform model training, use a generative adversarial network to generate a video, and optimize a generator network. The video generation submodule mainly includes a generator in the generative adversarial network. The video optimization submodule mainly includes an adversarial network, so that a generated video is more realistic. In addition, a video optimization result may be fed back to the video generation submodule, and used by the video generation submodule to train a generator network model.

Video generation submodule: The generator network in the video generation submodule may be implemented by using an RNN network, and the RNN network has a good capability of remembering context information. The generator network is a fully convolutional network including a plurality of convolutional layers and a plurality of upsampling layers, and input may include <image information, and text information>. The generator can generate rich videos. A sample generated by using the generator can be further standardized by using an input constraint, and sent to a discriminator network together with video data in a real world, to improve quality of a generated video, thereby facilitating generation of a real-time status video.

Video optimization submodule: includes the discriminator network. The discriminator network receives a data result from the video generation module and the video data collected in the real world, to perform adversarial training. A main purpose of the discriminator network is to make the generated video more realistic and avoid the generated video being too smooth or having an obvious patch effect. Input of the discriminator is <generated video, and real video>. By using the two input videos, the discriminator determines whether the generated video may be considered as a real video. That is, when a difference between the generated video and the real video is very small, the discriminator determines that the generated video is a real video, and in this case, a discrimination loss result of the discriminator is 1. When the difference between the generated video and the real video is large, the discriminator determines that the generated video is not a real video. In this case, the discrimination loss result of the discriminator is 0, quality of the video generated by the generator network is poor, and further training is needed. Therefore, when the video generated by the generator network may be determined as a real video, generator network training optimization is considered successful. In such an adversarial training manner, authenticity of the generated video is gradually improved.

(3) Online Module

The online module uses a generator model trained by the offline module, to share a real-time status of the user on the terminal device. In this case, the video generation submodule also needs <static image, sensor information, and user input information> as input, but the video optimization submodule is not needed. This reduces a quantity of model parameters, and reduces power consumption of the mobile phone.

It should be noted that, when the video generation apparatus needs to be deployed on the terminal device, only a trained video generation submodule may alternatively need to be deployed in the offline module, to complete real-time status sharing of the terminal device. This is not specifically limited in this disclosure.

Based on the video generation apparatus provided in FIG. 3A, and based on the three scenarios and the UI embodiments in each scenario that are provided in FIG. 2A(1) to FIG. 2M, the following describes a video generation method provided in an embodiment of this disclosure, and specifically analyzes and resolves the technical problem proposed in this disclosure.

Figure 3B:
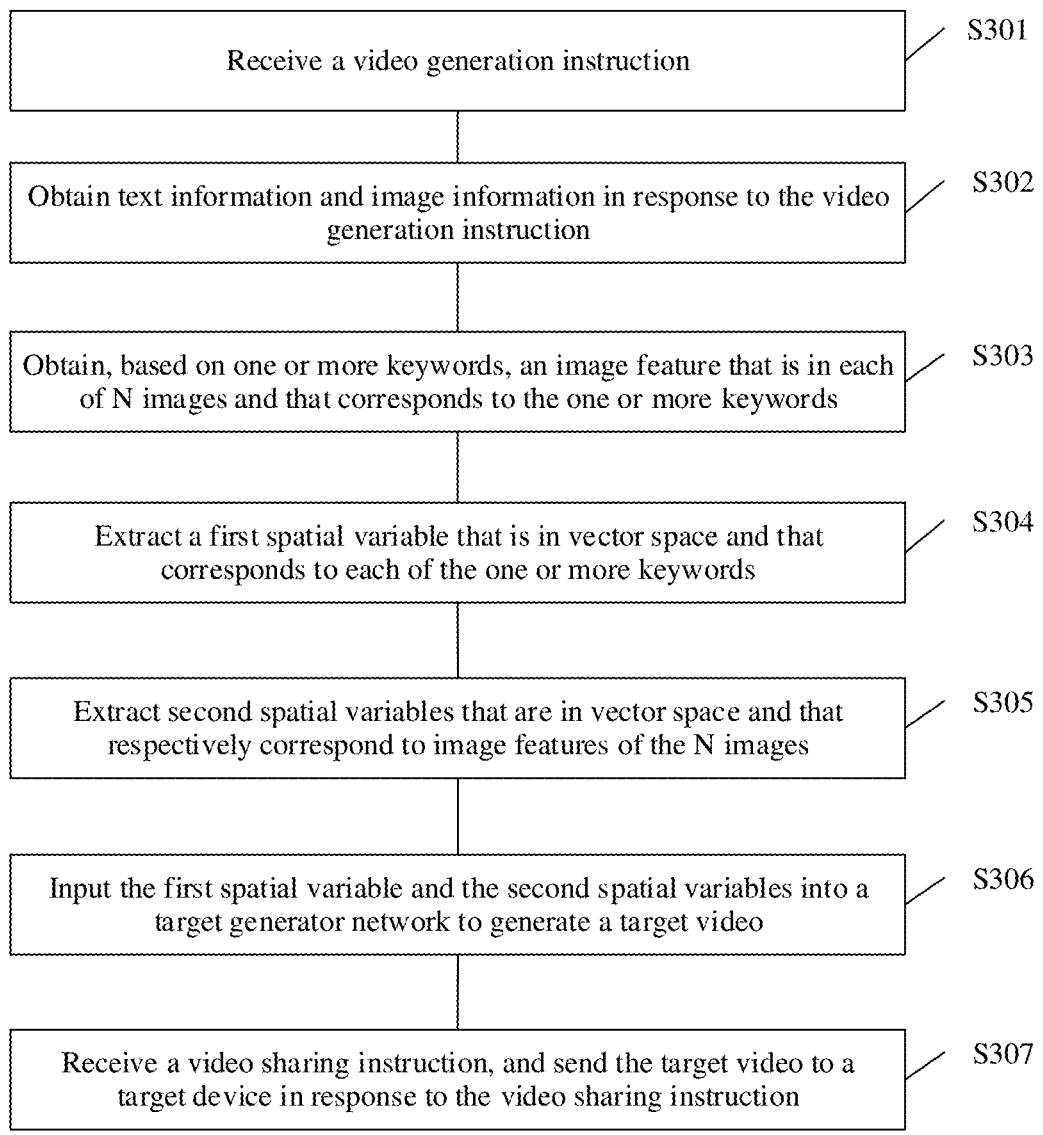
FIG. 3B is a schematic flowchart of a video generation method according to an embodiment of this disclosure.

FIG. 3B is a schematic flowchart of a video generation method according to an embodiment of this disclosure. The method may be applied to the electronic device in FIG. 1A. The video generation apparatus may be configured to support and perform step S301 to step S307 of a method procedure shown in FIG. 3B. The following description is provided from a video generation apparatus side with reference to FIG. 3B. The method may include the following steps S301 to S307.

Step S301: Receive a Video Generation Instruction.

Specifically, the video generation apparatus receives the video generation instruction, and the video generation apparatus may receive the video generation instruction of a user through touch operation recognition, gesture operation recognition, voice control recognition, or the like.

Step S302: Obtain Text Information and Image Information in Response to the Video Generation Instruction.

Specifically, the video generation apparatus obtains the text information and the image information in response to the video generation instruction. After receiving the video generation instruction, the video generation apparatus obtains the text information and the image information in response to the instruction. The text information is used to describe content of a subsequently generated video. The image information includes N images, and the N images are used by the video generation apparatus to generate M images in the video based on the text information and the N images. The M images are images that are generated based on image features of the N images and that correspond to one or more keywords, and M is a positive integer greater than 1.

In a possible implementation, the obtaining text information in response to the video generation instruction includes: obtaining the text information from one or more of text input information, voice input information, user preference information, user physiological data information, or current environment information in response to the video generation instruction, where the current environment information includes one or more of current weather information, current time information, or current geographical location information. The electronic device may obtain information (text input information or voice input information) specifically input by the user, or obtain current environment information by using a sensor on the electronic device, or extract text information from user preference information extracted from historical interaction information. For example, when the user does not or cannot perform manual or voice input, only current environment information obtained by the sensor or a preference extracted from historical interaction information may also be relied on and used as the input text information, which is used together with the input image information to generate a target video.

In a possible implementation, the obtaining image information in response to the video generation instruction includes: obtaining, in response to the video generation instruction, an image corresponding to at least one of the one or more keywords from a plurality of pre-stored images. The electronic device may obtain, based on text information, image information related to the text information. For example, when the image information is obtained, an image of a corresponding place may be obtained based on current geographical location information or place information entered by the user, to generate a target video. For example, when the user visits the Palace Museum, an image related to the Palace Museum may be obtained and used to synthesize a target video, to facilitate real-time sharing of a life status by the user. When the image information is obtained, an image of a corresponding place may alternatively be obtained based on person information entered by the user, to generate a target video, so that a user requirement is met. For example, the user enters "Xiaoming is playing football on a playground", and at least one related image of keywords "Xiaoming", "playground", and "football" may be obtained and used to synthesize a target video.

In a possible implementation, the video generation instruction includes a facial recognition request; and the obtaining image information in response to the video generation instruction includes: performing facial recognition in response to the video generation instruction and obtaining a facial recognition result; and obtaining, based on the facial recognition result, at least one image that matches the facial recognition result from a plurality of pre-stored images. When obtaining the image information, the electronic device may first obtain a facial recognition result by performing facial recognition, and further directly obtain, from the pre-stored images based on the facial recognition result, an image that includes the user. This facilitates direct generation of a status video related to the user, and timely sharing of a current status of the user. For example, after a user A is recognized through facial recognition, an image of the user A may be obtained from a plurality of pre-stored images. In this way, a video including the user A may be generated without requiring the user to screen images, thereby facilitating a user operation, and improving user experience.

In a possible implementation, the video generation instruction includes at least one image label, and each image label in the at least one image label corresponds to at least one of a plurality of pre-stored images; and the obtaining image information in response to the video generation instruction includes: obtaining, in response to the video generation instruction and based on the at least one image label, at least one image corresponding to each image label in the at least one image label from the plurality of pre-stored images. For example, the user may select an image label "cat", and after a plurality of images of the cat are obtained, a dynamic video with the cat as a leading role is generated by using the plurality of images of the cat together with text information. For another example, the user may further select an image label "Xiaoming in childhood", and after a plurality of images of Xiaoming in childhood are obtained, a dynamic video about childhood of Xiaoming is generated by using the plurality of images of Xiaoming in childhood together with text information. When obtaining the image information, the electronic device may obtain at least one corresponding image by using the at least one image label carried in the video generation instruction, to generate a target video. When the user wants to generate an interesting video by using some images, images that the user is interested in or requires may be directly obtained through screening, to generate a video, so that a viewing requirement of the user is met.

In a possible implementation, image quality of each of the obtained N images is greater than a preset threshold. Before the image information is obtained, image quality scoring needs to be performed on a to-be-selected image, and when an image quality score is less than the preset threshold, the image is not used to generate the video. The video is generated by using an image whose image quality is greater than the preset threshold, thereby ensuring that image quality of the target video finally generated by using the image is relatively high, so that viewing experience of the user is met.

In a possible implementation, the method further includes: performing image quality scoring on the obtained N images, to obtain an image quality scoring result corresponding to each of the N images; and performing image quality enhancement processing on an image whose image quality scoring result is less than a preset threshold, and updating the image with enhanced image quality to the N images. After the image information is obtained, image quality scoring needs to be performed on all obtained images. When quality of an image is relatively poor, image quality enhancement may be performed on the image, to improve video quality when the video is generated by using the image, thereby meeting viewing experience of the user.

Step S303: Obtain, Based on the One or More Keywords, an Image Feature that is in Each of the N Images and Corresponds to the One or More Keywords.

Specifically, the video generation apparatus extracts, based on the one or more keywords, the image feature that is in each of the N images and that corresponds to the one or more keywords. For example, if the text information includes a keyword football, the video generation apparatus needs to extract an image feature of the football from each of the N images, so that the video generation apparatus generates a video based on the image feature of the football.

Step S304: Extract a First Spatial Variable that is in Vector Space and that Corresponds to Each of the One or More Keywords.

Specifically, the video generation apparatus may separately extract the first spatial variable that is in vector space and that corresponds to each of the one or more keywords. The first spatial variable is a word vector of the keyword in vector space.

Step S305: Extract Second Spatial Variables that are in Vector Space and that Respectively Correspond to the Image Features of the N Images.

Specifically, the video generation apparatus may extract a second spatial variable that is in vector space and that corresponds to the image feature that is in each of the N images and that corresponds to the one or more keywords. The second spatial variable is a vector of the image feature in vector space, and is used to represent the image feature.

Step S306: Input the First Spatial Variable and the Second Spatial Variables into a Target Generator Network to Generate a Target Video.

Specifically, the video generation apparatus inputs the first spatial variable and the second spatial variables into the target generator network to generate the target video, that is, inputs the one or more keywords and the image features of the N images into the target generator network to generate the target video.

In a possible implementation, the inputting the one or more keywords and the image features of the N images into the target generator network to generate the target video includes: extracting the first spatial variable that is in vector space and that corresponds to each of the one or more keywords; extracting the second spatial variables that are in vector space and that respectively correspond to the image features of the N images; and inputting the first spatial variable and the second spatial variables into the target generator network to generate the target video. First, the first spatial variable corresponding to the text information and a second spatial variable of the image feature of each image in the image information may be separately extracted. The first spatial variable may be a word vector that is in latent space and that identifies the text information. The second spatial variable of each image may be a vector that is in latent space and that identifies the image feature of the image. Spatial vector extraction helps the generator network better generate the target video.

In a possible implementation, the method further includes: obtaining sample text information, sample image information, and a real video data set, and building a discriminator network and a video generation-based generator network; inputting the sample text information and the sample image information into the generator network to generate a sample video; using the sample video and the real video data set as input to the discriminator network to obtain a discrimination loss result, where the discrimination loss result is 1 when the sample video belongs to the real video data set; and training the generator network based on the discrimination loss result to obtain the target generator network. The video generation apparatus needs to train the generator network and the discriminator network by using sample data. The video generation apparatus first generates a video based on the sample data by using the generator network, and then inputs <generated video, and real video> into a discriminator. The discriminator determines a source of the input, and if the source of the input is the generated video, the discriminator determines the input as false 0; or otherwise, the discriminator determines the input as true 1. In such a repeated adversarial training manner, content of the generated video can be further standardized, and authenticity of the generated video and quality of the generated video can be gradually improved.

Step S307: Receive a Video Sharing Instruction, and Send the Target Video to a Target Device in Response to the Video Sharing Instruction.

Specifically, the video generation apparatus may receive the video sharing instruction, and send the target video to the target device in response to the video sharing instruction. After the target video is generated, the user may further share the video in WeChat Moments, so that the generated target video is shared with the target terminal device, to promote friendly development of a social platform, and improve life and friend-making experience of the user.

It should be noted that, for related descriptions of step S301 to step S307 in this embodiment, correspondingly refer to the related descriptions of the embodiments in FIG. 2A(1) to FIG. 2M.

During implementation of this embodiment, the electronic device may generate a video based on text information and image information, so that a user may share a life status of the user in real time. After receiving a video generation instruction, the electronic device may obtain text information and image information in response to the video generation instruction, where the text information includes one or more keywords, and the image information includes N images. The text information may be used to describe video content (for example, the one or more keywords may include a person, a time, a place, an event, or an action) of a to-be-generated video, and the image information may be used to extract or generate a video image of each frame. Therefore, an image feature that is in each of the N images and that corresponds to the one or more keywords may be obtained based on the one or more keywords, and then the one or more keywords and image features of the N images may be input into the target generator network to generate a target video. The target video may include M images that are generated based on the image features of the N images and that correspond to the one or more keywords. Therefore, the video is generated by jointly using a text and the images, so that for the generated video, the input image information may be adjusted based on the input text information, thereby greatly enriching the video content, and avoiding a video generated by directly stacking a plurality of images on an existing terminal device, where the video is limited to switching-type showing in a form of slides and lacks richness of content. In addition, requirements of the user in vision and hearing are met.

The foregoing describes the method in the embodiments in detail. The following provides a related apparatus in the embodiments.

Figure 4:
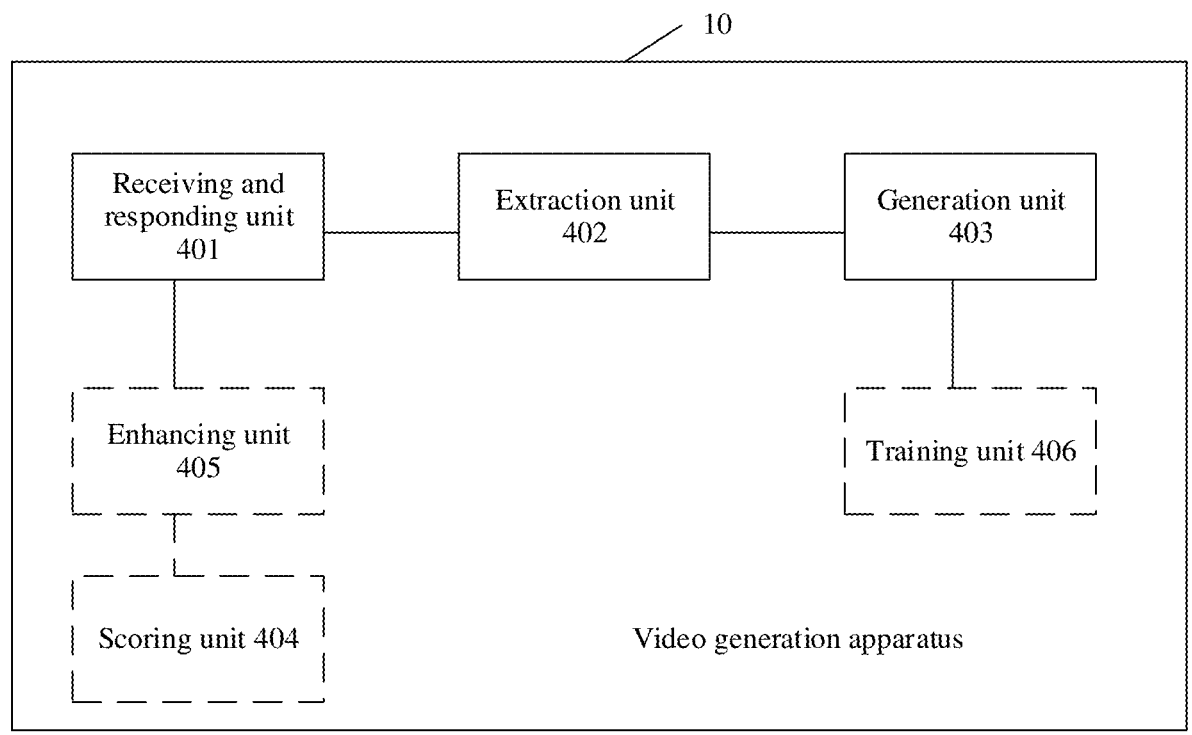
FIG. 4 is a schematic diagram of a structure of another video generation apparatus according to an embodiment of this disclosure.

FIG. 4 is a schematic diagram of a structure of another video generation apparatus according to an embodiment of this disclosure. The video generation apparatus 10 may include a receiving and responding unit 401, an extraction unit 402, and a generation unit 403; and may further include a scoring unit 404, an enhancing unit 405, and a training unit 406. Each unit is described below in detail.

The receiving and responding unit 401 is configured to receive a video generation instruction, and obtain text information and image information in response to the video generation instruction, where the text information includes one or more keywords, the image information includes N images, and N is a positive integer greater than or equal to 1.

The extraction unit 402 is configured to obtain, based on the one or more keywords, an image feature that is in each of the N images and that corresponds to the one or more keywords.

The generation unit 403 is configured to input the one or more keywords and image features of the N images into a target generator network to generate a target video, where the target video includes M images, the M images are images that are generated based on the image features of the N images and that correspond to the one or more keywords, and M is a positive integer greater than 1.

In a possible implementation, the receiving and responding unit 401 is specifically configured to obtain the text information from one or more of text input information, voice input information, user preference information, user physiological data information, or current environment information in response to the video generation instruction, where the current environment information includes one or more of current weather information, current time information, or current geographical location information.

In a possible implementation, the receiving and responding unit 401 is specifically configured to obtain, in response to the video generation instruction, an image corresponding to at least one of the one or more keywords from a plurality of pre-stored images.

In a possible implementation, the video generation instruction includes a facial recognition request; and the receiving and responding unit 401 is specifically configured to: perform facial recognition in response to the video generation instruction and obtain a facial recognition result; and obtain, based on the facial recognition result, at least one image that matches the facial recognition result from a plurality of pre-stored images.

In a possible implementation, the video generation instruction includes at least one image label, and each image label in the at least one image label corresponds to at least one of a plurality of pre-stored images; and the receiving and responding unit 401 is specifically configured to: obtain, in response to the video generation instruction and based on the at least one image label, at least one image corresponding to each image label in the at least one image label from the plurality of pre-stored images.

In a possible implementation, image quality of each of the obtained N images is greater than a preset threshold.

In a possible implementation, the apparatus further includes: the scoring unit 404, configured to perform image quality scoring on the obtained N images, to obtain an image quality scoring result corresponding to each of the N images; and the enhancing unit 405, configured to perform image quality enhancement processing on an image whose image quality scoring result is less than a preset threshold, and update the image with enhanced image quality to the N images.

In a possible implementation, the generation unit 403 is specifically configured to: extract a first spatial variable that is in vector space and that corresponds to each of the one or more keywords; extract second spatial variables that are in vector space and that respectively correspond to the image features of the N images; and input the first spatial variable and the second spatial variables into the target generator network to generate the target video.

In a possible implementation, the apparatus further includes the training unit 406. The training unit 406 is configured to: obtain sample text information, sample image information, and a real video data set, and build a discriminator network and a video generation-based generator network; input the sample text information and the sample image information into the generator network to generate a sample video; use the sample video and the real video data set as input to the discriminator network to obtain a discrimination loss result, where the discrimination loss result is 1 when the sample video belongs to the real video data set; and train the generator network based on the discrimination loss result to obtain the target generator network.

It should be noted that, for functions of the functional units in the video generation apparatus 10 described in this embodiment, refer to the related descriptions of step S301 to step S307 in the method embodiment described in FIG. 3B.

Figure 5:
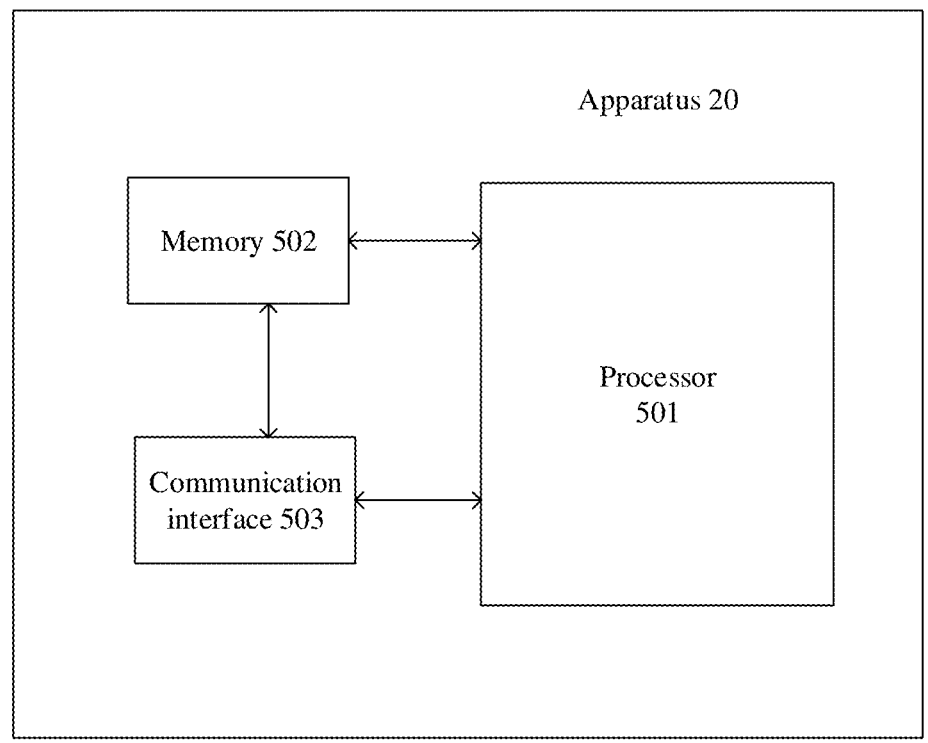
FIG. 5 is a schematic diagram of a structure of still another video generation apparatus according to an embodiment of this disclosure.

FIG. 5 is a schematic diagram of a structure of still another video generation apparatus according to an embodiment of this disclosure. The apparatus 20 includes at least one processor 501, at least one memory 502, and at least one communication interface 503. In addition, the apparatus may further include a general component such as an antenna.

The processor 501 may be a general-purpose central processing unit (CPU), a microprocessor, an application-specific integrated circuit (ASIC), or one or more integrated circuits configured to control program execution in the foregoing solutions.

The communication interface 503 is configured to communicate with another device or a communication network, such as an Ethernet, a radio access network (RAN), a core network, or a wireless local area network (WLAN).

The memory 502 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory 502 is not limited thereto. The memory may exist independently, and is connected to the processor through the bus. Alternatively, the memory may be integrated with the processor.

The memory 502 is configured to store application code for executing the foregoing solutions, and the processor 501 controls the execution. The processor 501 is configured to execute the application code stored in the memory 502.

The code stored in the memory 502 may be used to perform the foregoing video generation method, for example, receiving a video generation instruction, and obtaining text information and image information in response to the video generation instruction, where the text information includes one or more keywords, the image information includes N images, and N is a positive integer greater than or equal to 1; obtaining, based on the one or more keywords, an image feature that is in each of the N images and that corresponds to the one or more keywords; and inputting the one or more keywords and image features of the N images into a target generator network to generate a target video, where the target video includes M images, the M images are images that are generated based on the image features of the N images and that correspond to the one or more keywords, and M is a positive integer greater than 1.

It should be noted that, for functions of the functional units in the video generation apparatus 20 described in this embodiment, refer to the related descriptions of step S301 to step S307 in the method embodiment described in FIG. 3B.

In the foregoing embodiments, descriptions of embodiments have respective focuses. For a part that is not described in detail in an embodiment, refer to related description in other embodiments.

It should be noted that, for brief description, the foregoing method embodiments are represented as a series of actions. However, a person skilled in the art should appreciate that this disclosure is not limited to the described order of the actions, because according to this disclosure, some steps may be performed in other orders or simultaneously.

In the several embodiments provided in this disclosure, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in the form of a computer software product. The computer software product is stored in a storage medium and includes several instructions for instructing a computer device (which may be a personal computer, a server, or a network device) to perform all or some of the steps of the methods described in embodiments of this disclosure. The foregoing storage medium includes any medium that can store program code, such as a USB flash drive, a removable hard disk, a magnetic disk, an optical disc, a read-only memory (ROM), or a random access memory (RAM).

The foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

What is claimed is:

1. A video generation method, comprising:
receiving a video generation instruction, and obtaining text information and image information in response to the video generation instruction, wherein the text information comprises one or more keywords, the image information comprises N images, and N is a positive integer greater than or equal to 1;
obtaining, based on the one or more keywords, at least one image feature, of the N images, that corresponds to the one or more keywords; and
inputting the one or more keywords and the at least one image feature of the N images into a target generator network to generate a target video, wherein the target video comprises M images, the M images are generated based on the at least one image feature and correspond to the one or more keywords, and M is a positive integer greater than 1,
wherein inputting the one or more keywords and the at least one image feature of the N images into the target generator network to generate the target video comprises:
extracting a first spatial variable that is in vector space and corresponds to each of the one or more keywords;

extracting second spot variables that are in vector space and respectively correspond to the at least one image feature of the N images; and inputting the first spatial variable and the second spatial variables into the target generator network to generate the target video.

2. The method of claim 1, wherein obtaining of the text information in response to the video generation instruction comprises:

obtaining the text information from one or more of text input information, voice input information, user preference information, user physiological data information, or current environment information in response to the video generation instruction, wherein the current environment information comprises one or more of current weather information, current time information, or current geographical location information.

3. The method of claim 1, wherein obtaining of the image information in response to the video generation instruction comprises:

obtaining, in response to the video generation instruction, an image corresponding to at least one of the one or more keywords from a plurality of pre-stored images.

4. The method of claim 1, wherein obtaining of the image information in response to the video generation instruction comprises:

performing facial recognition in response to the video generation instruction and obtaining a facial recognition result, wherein the video generation instruction comprises a facial recognition request; and obtaining, based on the facial recognition result, at least one image that matches the facial recognition result from a plurality of pre-stored images.

5. The method of claim 3, wherein the video generation instruction comprises at least one image label, and obtaining of the image information in response to the video generation instruction comprises:

in response to the video generation instruction, obtaining, based on the at least one image label, at least one image corresponding to each image label in the at least one image label from the plurality of pre-stored images, wherein each image label in the at least one image label corresponds to at least one of a plurality of pre-stored images.

6. The method of claim 1, wherein image quality of each of the N images is greater than a threshold.

7. The method of claim 1, further comprising:

performing image quality scoring on the N images, to obtain an image quality scoring result corresponding to each of the N images; and performing image quality enhancement processing on an image whose image quality scoring result is less than a threshold, and updating the image with enhanced image quality to the N images.

8. The method of claim 1, further comprising:

obtaining sample text information, sample image information, and a real video data set, and building a discriminator network and a video generation-based generator network;

inputting the sample text information and the sample image information into the video generation-based generator network to generate a sample video;

using the sample video and the real video data set as input to the discriminator network to obtain a discrimination loss result, wherein the discrimination loss result is 1 when the sample video belongs to the real video data set; and training the video generation-based generator network based on the discrimination loss result to obtain the target generator network.

9. An electronic device, comprising at least one processor and a memory, wherein the memory is configured to store program code including instructions that, when executed by the at least one processor, cause the electronic device to:

receive a video generation instruction, and obtain text information and image information in response to the video generation instruction, wherein the text information comprises one or more keywords, the image information comprises N images, and N is a positive integer greater than or equal to 1;

obtain, based on the one or more keywords, at least one image feature, of the N images, that corresponds to the one or more keywords; and input the one or more keywords and the at least one image feature of the N images into a target generator network to generate a target video, wherein the target video comprises M images, the M images are generated based on the at least one image feature and correspond to the one or more keywords, and M is a positive integer greater than 1, wherein inputting the one or more keywords and the at least one image feature of the N images into the target generator network to generate the target video comprises:

extracting a first spatial variable that is in vector space and corresponds to each of the one or more keywords;

extracting second spot variables that are in vector space and respectively correspond to the at least one image feature of the N images; and inputting the first spatial variable and the second spatial variables into the target generator network to generate the target video.

10. The electronic device of claim 9, wherein obtaining of the text information in response to the video generation instruction comprises:

obtaining the text information from one or more of text input information, voice input information, user preference information, user physiological data information, or current environment information in response to the video generation instruction, wherein the current environment information comprises one or more of current weather information, current time information, or current geographical location information.

11. The electronic device of claim 9, wherein obtaining of the image information in response to the video generation instruction comprises:

obtaining, in response to the video generation instruction, an image corresponding to at least one of the one or more keywords from a plurality of pre-stored images.

12. The electronic device of claim 9, wherein obtaining of the image information in response to the video generation instruction comprises:

performing facial recognition in response to the video generation instruction and obtaining a facial recognition result, wherein the video generation instruction comprises a facial recognition request; and obtaining, based on the facial recognition result, at least one image that matches the facial recognition result from a plurality of pre-stored images.

13. The electronic device of claim 11, wherein the video generation instruction comprises at least one image label, and obtaining of the image information in response to the video generation instruction comprises:

in response to the video generation instruction, obtaining, based on the at least one image label, at least one image corresponding to each image label in the at least one image label from the plurality of pre-stored images, wherein each image label in the at least one image label corresponds to at least one of a plurality of pre-stored images.

14. The electronic device of claim 11, wherein image quality of each of the N images is greater than a threshold.

15. The electronic device of claim 9, wherein the instructions, when executed by the at least one processor, further cause the electronic device to:
perform image quality scoring on the N images, to obtain an image quality scoring result corresponding to each of the N images; and
perform image quality enhancement processing on an image whose image quality scoring result is less than a threshold, and update the image with enhanced image quality to the N images.

16. The electronic device of claim 9, wherein the instructions, when executed by the at least one processor, further cause the electronic device to:
obtain sample text information, sample image information, and a real video data set, and build a discriminator network and a video generation-based generator network;
input the sample text information and the sample image information into the video generation-based generator network to generate a sample video;
use the sample video and the real video data set as input to the discriminator network to obtain a discrimination loss result, wherein the discrimination loss result is 1 when the sample video belongs to the real video data set; and
train the video generation-based generator network based on the discrimination loss result to obtain the target generator network.

17. A non-transitory computer storage medium storing a computer program including instructions that, when executed by at least one processor, cause a device to:
receive a video generation instruction, and obtain text information and image information in response to the video generation instruction, wherein the text information comprises one or more keywords, the image information comprises N images, and N is a positive integer greater than or equal to 1;
obtain, based on the one or more keywords, at least one image feature, of the N images, that corresponds to the one or more keywords; and
input the one or more keywords and the at least one image feature of the N images into a target generator network to generate a target video, wherein the target video comprises M images, the M images are generated based on the at least one image feature and correspond to the one or more keywords, and M is a positive integer greater than 1,
wherein inputting the one or more keywords and the at least one image feature of the N images into the target generator network to generate the target video comprises:
extracting a first spatial variable that is in vector space and corresponds to each of the one or more keywords;
extracting second spot variables that are in vector space and respectively correspond to the at least one image feature of the N images; and
inputting the first spatial variable and the second spatial variables into the target generator network to generate the target video.

18. The non-transitory computer storage medium of claim 17, wherein obtaining of the text information in response to the video generation instruction comprises:
obtaining the text information from one or more of text input information, voice input information, user preference information, user physiological data information, or current environment information in response to the video generation instruction, wherein the current environment information comprises one or more of current weather information, current time information, or current geographical location information.

* * * * *

UNITED STATES PATENT AND TRADEMARK OFFICE
CERTIFICATE OF CORRECTION

PATENT NO. : 12,225,271 B2  
APPLICATION NO. : 18/070689  
DATED : February 11, 2025  
INVENTOR(S) : Bin Shao et al.

Page 1 of 1

It is certified that error appears in the above-identified patent and that said Letters Patent is hereby corrected as shown below:

In the Claims

Column 37, Claim 1, Line 1, change "second spot" to --second spatial--;

Column 38, Claim 9, Line 31, change "second spot" to --second spatial--; and

Column 40, Claim 17, Line 23, change "second spot" to --second spatial--.

Signed and Sealed this  
Eleventh Day of March, 2025

Coke Morgan Stewart  
*Acting Director of the United States Patent and Trademark Office*